United States Patent
Katoh

(10) Patent No.: US 11,262,634 B2
(45) Date of Patent: Mar. 1, 2022

(54) STRUCTURE COMPRISING A REFLECTIVE LAYER HAVING LINES FORMED BY BRIGHT PORTIONS AND DARK PORTIONS DERIVED FROM A CHOLESTERIC LIQUID CRYSTALLINE PHASE AND METHOD FOR FORMING THE REFLECTIVE LAYER

(71) Applicant: FUJIFILM Corporation, Tokyo (JP)

(72) Inventor: Shunya Katoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 58 days.

(21) Appl. No.: 16/788,252

(22) Filed: Feb. 11, 2020

(65) Prior Publication Data

US 2020/0183214 A1 Jun. 11, 2020

Related U.S. Application Data

(63) Continuation of application No. PCT/JP2018/030225, filed on Aug. 13, 2018.

(30) Foreign Application Priority Data

Aug. 14, 2017 (JP) .............................. JP2017-156482

(51) Int. Cl.
  *G02F 1/137* (2006.01)
  *C09K 19/56* (2006.01)
  *G02B 5/26* (2006.01)
(52) U.S. Cl.
  CPC .......... *G02F 1/13718* (2013.01); *C09K 19/56* (2013.01); *G02B 5/26* (2013.01); *G02F 2201/343* (2013.01)
(58) Field of Classification Search
  CPC .......... G02F 1/13718; G02F 2201/343; G02F 1/133543; C09K 19/586
  See application file for complete search history.

(56) References Cited

U.S. PATENT DOCUMENTS 4,688,901 A    8/1987   Albert
6,537,624 B1 *   3/2003   Suzuki ................. G02B 5/3016
                                              428/1.3

(Continued)

FOREIGN PATENT DOCUMENTS

CN     108641582 A   *   10/2018   ......... C09K 19/2007
CN     109917590 A   *   6/2019   ........... G02F 1/1341

(Continued)

OTHER PUBLICATIONS

"International Search Report (Form PCT/ISA/210) of PCT/JP2018/030225," dated Nov. 13, 2018, with English translation thereof, pp. 1-5.

(Continued)

*Primary Examiner* — Paul C Lee
(74) *Attorney, Agent, or Firm* — JCIPRNET

(57) ABSTRACT

An object of the present invention is to provide a structure having a reflective layer that has satisfactory transparency and diffuse reflectivity and is also capable of reducing the occurrence of glare, and a method for forming the reflective layer. The object of the present invention is achieved by a structure including a substrate and a reflective layer formed by immobilizing a cholesteric liquid crystalline phase, in which, upon observing a cross section of the reflective layer by a scanning electron microscope, lines formed by bright portions and lines formed by dark portions derived from the cholesteric liquid crystalline phase have a wave-like structure or are inclined with respect to the surface of the substrate, and at least a part of the lines formed by the bright portions and the lines formed by the dark portions are discontinuous.

12 Claims, 3 Drawing Sheets

(56) References Cited

U.S. PATENT DOCUMENTS

| | | | |
|---|---|---|---|
| 6,876,427 B2 * | 4/2005 | Bowley | G02F 1/133536 |
| | | | 349/185 |
| 10,795,254 B2 | 10/2020 | Yanai et al. | |
| 2015/0029445 A1 * | 1/2015 | Takeda | G02B 5/3016 |
| | | | 349/96 |

FOREIGN PATENT DOCUMENTS

| | | |
|---|---|---|
| JP | S5929236 | 2/1984 |
| JP | 2001002797 | 1/2001 |
| JP | 2003084131 | 3/2003 |
| JP | 2005107296 | 4/2005 |
| JP | 2005107296 A * | 4/2005 |
| JP | 2016197161 | 11/2016 |
| WO | 9934242 | 7/1999 |
| WO | 2017030176 | 2/2017 |
| WO | 2017110629 | 6/2017 |
| WO | WO-2018105726 A1 * | 6/2018 ........... G02F 1/1334 |

OTHER PUBLICATIONS

"Written Opinion of the International Searching Authority (Form PCT/ISA/237) of PCT/JP2018/030225," dated Nov. 13, 2018, with English translation thereof, pp. 1-17.

"Office Action of Japan Counterpart Application" with English translation thereof, dated Mar. 2, 2021, p. 1-p. 12.

Office Action of Japan Counterpart Application, with English translation thereof, dated Jul. 13, 2021, pp. 1-11.

"Office Action of China Counterpart Application" with partial English translation thereof, dated Oct. 22, 2021, p. 1-p. 22.

* cited by examiner

STRUCTURE COMPRISING A REFLECTIVE LAYER HAVING LINES FORMED BY BRIGHT PORTIONS AND DARK PORTIONS DERIVED FROM A CHOLESTERIC LIQUID CRYSTALLINE PHASE AND METHOD FOR FORMING THE REFLECTIVE LAYER

CROSS-REFERENCE TO RELATED APPLICATIONS

This application is a Continuation of PCT International Application No. PCT/JP2018/030225 filed on Aug. 13, 2018, which claims priority under 35 U.S.C. § 119(a) to Japanese Patent Application No. 2017-156482 filed on Aug. 14, 2017. The above application is hereby expressly incorporated by reference, in its entirety, into the present application.

BACKGROUND OF THE INVENTION

1. Field of the Invention

The present invention relates to a structure having a reflective layer formed by immobilizing a cholesteric liquid crystalline phase, and a method for forming a reflective layer in the structure.

2. Description of the Related Art

As a structure that exhibits reflection performance by an interference phenomenon, for example, there are known an organic multilayer film in which two or more types of polymers having different refractive indices are repeatedly laminated, a reflective layer formed by immobilizing a cholesteric liquid crystalline phase in which liquid crystal molecules form a helical structure, and a dielectric multilayer film in which vapor-deposited films of inorganic materials are laminated.

Such a reflective structure exhibits specular reflectivity in a case where a reflection axis is uniform in a direction perpendicular to a substrate (base material).

On the other hand, the reflective structure exhibits diffuse reflectivity in a configuration in which the reflection axis of the reflection structure is non-uniform; a configuration in which the reflection axis in the reflective structure is continuously changed in a direction that is not perpendicular to the substrate; or the like. Such a reflective structure exhibiting diffuse reflectivity can be used for applications such as screens and decoration.

For example, a cholesteric liquid crystal film described in JP2001-002797A is known as a configuration having diffuse reflectivity in a reflective structure having a reflective layer formed by immobilizing a cholesteric liquid crystalline phase.

This cholesteric liquid crystal film is a cholesteric liquid crystal film in which the cholesteric alignment is immobilized in a state in which a helical axis direction in the cholesteric liquid crystalline phase is not uniformly parallel to a film thickness direction, and which has a diffusivity, which is defined by a ratio of a specular component excluded (SCE) to a specular component included (SCI) of the film "(SCE/SCI)×100", of 15% or more.

SUMMARY OF THE INVENTION

As shown in JP2001-002797A, diffuse reflectivity can be obtained by making the reflection axis (helical axis) of the cholesteric liquid crystalline phase non-uniform.

On the other hand, in the configuration in which the reflection axis is made non-uniform, strong scattering occurs even in a wavelength range other than the wavelength reflected by an interference phenomenon. Therefore, for example, in an application such as a transparent screen, there is a problem that opacity increases in all wavelength ranges.

On the other hand, such a problem can be solved by continuously changing the direction of the reflection axis.

In a reflective layer formed by immobilizing a cholesteric liquid crystalline phase, lines formed by bright portions and lines formed by dark portions derived from the cholesteric liquid crystalline phase are observed in a stripe pattern, in the cross section of the reflective layer. In the reflective layer formed by immobilizing a cholesteric liquid crystalline phase, the lines formed by the bright portions and the lines formed by the dark portions have a wave-like structure (a periodic uneven structure) under a certain condition.

Such a reflective layer, which is composed of a cholesteric liquid crystalline phase and in which the lines formed by the bright portions and the lines formed by the dark portions in the cross section has a wave-like structure, has a merit that the scattering in the wavelength range other than the wavelength reflected by the interference phenomenon is small and the opacity is hardly increased.

However, such a reflective layer, which is composed of a cholesteric liquid crystalline phase and in which the lines formed by the bright portions and the lines formed by the dark portions in the cross section has a wave-like structure, exhibits the occurrence of a strong diffraction phenomenon due to a periodic structure in an in-plane direction. Therefore, for example, in an application such as a screen, there is a problem that glare occurs in a projected image.

An object of the present invention is to provide a structure having a reflective layer that has satisfactory transparency and diffuse reflectivity (non-specular reflectivity) and is also capable of reducing the occurrence of glare, and a method for forming the reflective layer.

As a result of extensive studies to achieve the foregoing object, the present inventors have found that, in a case where a reflective layer formed by immobilizing a cholesteric liquid crystalline phase is configured such that lines formed by bright portions and lines formed by dark portions derived from the cholesteric liquid crystalline phase in a cross section in a thickness direction have a wave-like structure or are inclined with respect to a substrate, and there is a portion where the lines formed by the bright portions and the lines formed by the dark portions are discontinuous, the reflective layer has satisfactory transparency and diffuse reflectivity, and is also capable of reducing the occurrence of glare.

That is, the present invention achieves the object thereof by the following configuration.

[1] A structure comprising:
a substrate; and
a reflective layer formed by immobilizing a cholesteric liquid crystalline phase,
in which, upon observing a cross section of the reflective layer in a thickness direction by a scanning electron microscope, lines formed by bright portions and lines formed by dark portions derived from the cholesteric liquid crystalline phase have a wave-like structure or are inclined with respect to a surface of the substrate, and
at least a part of the lines formed by the bright portions and the lines formed by the dark portions are discontinuous.

[2] The structure according to [1], in which the number of a portion where the lines formed by the dark portions are discontinuous is 0.05 or more per 1 μm$^2$ of the cross section of the reflective layer.

[3] The structure according to [1] or [2], in which an alignment defect of the cholesteric liquid crystalline phase is included in a portion where the lines formed by the bright portions and the lines formed by the dark portions are discontinuous.

[4] The structure according to any one of [1] to [3], in which a particle is present in a portion where the lines formed by the bright portions and the lines formed by the dark portions are discontinuous.

[5] The structure according to any one of [1] to [4], in which the lines formed by the bright portions and the lines formed by the dark portions have a wave-like structure, and a wave period of the wave-like structure is 0.3 to 10 km.

[6] A method for forming a reflective layer, comprising:
applying a composition containing a liquid crystal compound and a chiral agent onto a surface of a substrate without subjecting the surface of the substrate to an alignment treatment, and curing the composition,
in a case of forming a reflective layer, which is formed by immobilizing a cholesteric liquid crystalline phase, on the surface of the substrate,
in which, upon observing a cross section of the reflective layer in a thickness direction by a scanning electron microscope, lines formed by bright portions and lines formed by dark portions derived from the cholesteric liquid crystalline phase have a wave-like structure or are inclined with respect to the surface of the substrate, and at least a part of the lines formed by the bright portions and the lines formed by the dark portions are discontinuous.

[7] A method for forming a reflective layer, comprising:
applying a composition containing a liquid crystal compound, a chiral agent, and a vertical alignment agent onto a surface of a substrate, and curing the composition,
in a case of forming a reflective layer, which is formed by immobilizing a cholesteric liquid crystalline phase, on the surface of the substrate,
in which, upon observing a cross section of the reflective layer in a thickness direction by a scanning electron microscope, lines formed by bright portions and lines formed by dark portions derived from the cholesteric liquid crystalline phase have a wave-like structure or are inclined with respect to the surface of the substrate, and at least a part of the lines formed by the bright portions and the lines formed by the dark portions are discontinuous.

[8] A method for forming a reflective layer, comprising:
applying a composition containing a liquid crystal compound, a chiral agent, and a particle onto a surface of a substrate, and curing the composition,
in a case of forming a reflective layer, which is formed by immobilizing a cholesteric liquid crystalline phase, on the surface of the substrate,
in which, upon observing a cross section of the reflective layer in a thickness direction by a scanning electron microscope, lines formed by bright portions and lines formed by dark portions derived from the cholesteric liquid crystalline phase have a wave-like structure or are inclined with respect to the surface of the substrate, and at least a part of the lines formed by the bright portions and the lines formed by the dark portions are discontinuous.

[9] The method for forming a reflective layer according to any one of [6] to [8], in which, after applying the composition onto the surface of the substrate, the composition is heated to bring the liquid crystal compound into a cholesteric liquid crystalline phase state, and then the composition is cooled or heated.

According to the present invention, there are provided a structure having a reflective layer that has satisfactory transparency and diffuse reflectivity (non-specular reflectivity) and is also capable of reducing the occurrence of glare in a projected image or the like, and a method for forming the reflective layer.

DESCRIPTION OF THE PREFERRED EMBODIMENTS

Hereinafter, the present invention will be described in detail. In the present specification, the numerical range expressed by using "to" means a range including numerical values described before and after "to" as a lower limit value and an upper limit value, respectively.

Further, in the present specification, the term "(meth)acrylate" is a notation expressing both acrylate and methacrylate, the term "(meth)acryloyl group" is a notation expressing both acryloyl group and methacryloyl group, and the term "(meth)acrylic" is a notation expressing both acrylic and methacrylic.

In the present invention, visible light is light having a wavelength visible to the human eye among electromagnetic waves, and indicates light in a wavelength range (wavelength region) of 400 to 700 nm. Invisible light is light in a wavelength range of shorter than 400 nm or a wavelength range of longer than 700 nm.

In addition, although not limited thereto, among visible light, light in a wavelength range of 420 to 490 nm is blue (B) light, and light in a wavelength range of 495 to 570 nm is green (G) light, and light in a wavelength range of 620 to 700 nm is red (R) light.

Furthermore, in the present invention, an ultraviolet ray (ultraviolet light) is light in a wavelength range of shorter than 400 nm and 200 nm or longer, and an infrared ray (infrared light) is light in a wavelength range of longer than 780 nm and 1 mm or shorter. In particular, the near-infrared region is light in a wavelength range of longer than 780 nm and 2000 nm or shorter.

Figure 1:
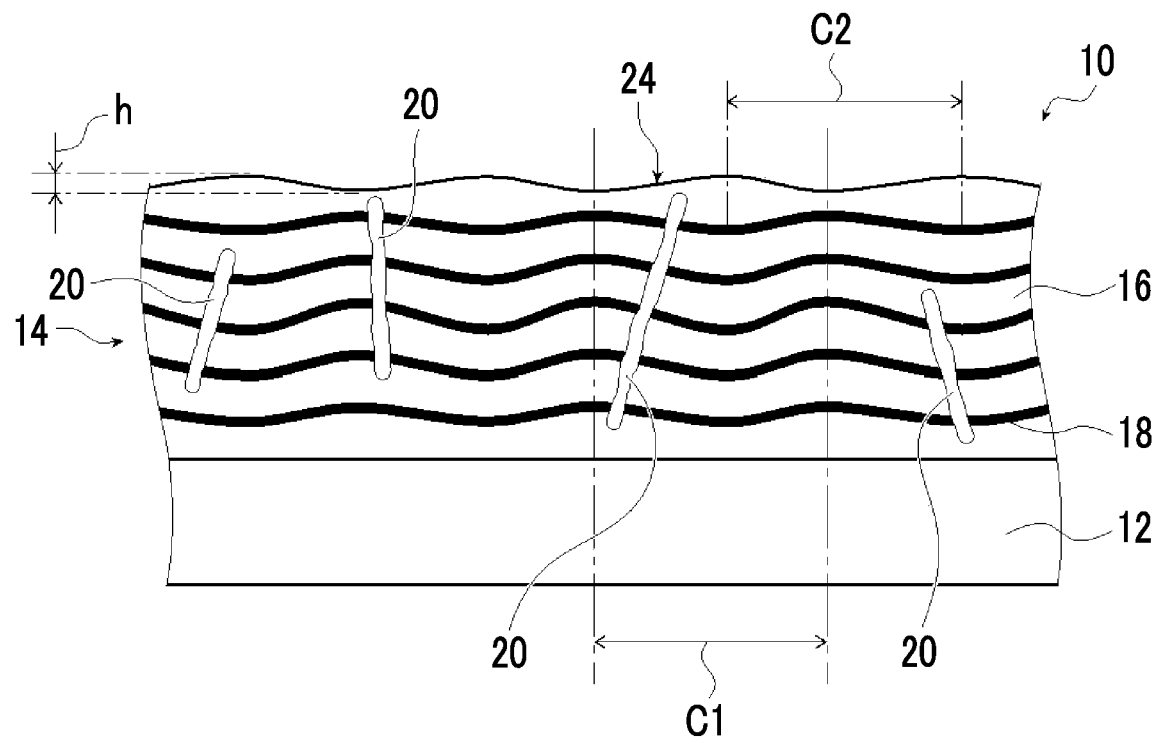
FIG. 1 is a cross-sectional view conceptually showing an example of a structure of the present invention.

FIG. 1 conceptually shows a cross section of the structure according to the embodiment of the present invention. FIG. 1 is a diagram conceptually showing, for example, a state where the cross section of the structure according to the embodiment of the present invention is observed with a scanning electron microscope (SEM). In this regard, the same applies to FIG. 2 and FIG. 3, and FIG. 6 and FIG. 7.

A structure 10 shown in FIG. 1 has a substrate 12 and a reflective layer 14 formed on one surface of the substrate 12. In the following description, the substrate 12 side of the structure 10 is also referred to as "lower", and the reflective layer 14 side is also referred to as "upper".

The reflective layer 14 is a layer formed by immobilizing a cholesteric liquid crystalline phase.

The layer formed by immobilizing a cholesteric liquid crystalline phase has liquid crystal molecules aligned in a helical shape, has wavelength selectivity for reflection, and selectively reflects either right circularly polarized light or left circularly polarized light in a predetermined wavelength range and transmits light other than that light.

In the structure according to the embodiment of the present invention, the reflective layer may reflect right circularly polarized light or may reflect left circularly polarized light. Alternatively, the structure according to the embodiment of the present invention may have both a reflective layer that reflects right circularly polarized light and a reflective layer that reflects left circularly polarized light.

In addition, in the structure according to the embodiment of the present invention, there is no limitation on the wavelength range where the reflective layer selectively reflects and the selective reflection central wavelength of the reflective layer. Therefore, the reflective layer may be a reflective layer that selectively reflects infrared light, a reflective layer that selectively reflects red light, a reflective layer that selectively reflects green light, a reflective layer that selectively reflects blue light, or a reflective layer that selectively reflects ultraviolet light.

In addition, the structure according to the embodiment of the present invention is not limited in the layer configuration thereof. Therefore, the structure according to the embodiment of the present invention may have, for example, a configuration including only one reflective layer that selectively reflects green light; a two-layer configuration including a reflective layer that selectively reflects red light and a reflective layer that selectively reflects green light; a three-layer configuration including a reflective layer that selectively reflects red light, a reflective layer that selectively reflects green light, and a reflective layer that selectively reflects blue light; a four-layer configuration including a reflective layer that selectively reflects infrared light, a reflective layer that selectively reflects red light, a reflective layer that selectively reflects green light, and a reflective layer that selectively reflects blue light; or a configuration including five or more reflective layers.

As described above, the reflective layer 14 is a layer formed by immobilizing a cholesteric liquid crystalline phase. In the following description, the layer formed by immobilizing a cholesteric liquid crystalline phase is also referred to as a "cholesteric liquid crystal layer".

Therefore, in the reflective layer 14 which is a cholesteric liquid crystal layer, a stripe pattern in which bright portions 16 and dark portions 18 derived from the cholesteric liquid crystal layer are alternately laminated in the thickness direction is observed in the cross section observed with SEM. That is, in the cross section of the reflective layer 14 in which the cholesteric liquid crystalline phase is immobilized, a layered structure in which the bright portions 16 and the dark portions 18 are alternately laminated is observed. The normal line of each line of the stripe pattern is the helical axis direction of the cholesteric liquid crystalline phase. The above-mentioned cross section is a cross section in the thickness direction of the reflective layer 14. In addition, the thickness direction of the reflective layer 14 is the vertical direction in FIG. 1.

Here, in the structure 10 of the illustrated example, the surface of the substrate 12 on which the reflective layer 14 is formed is a flat surface, but the lines formed by the bright portions 16 and the lines formed by the dark portions 18 in the cross section of the reflective layer 14 formed on the substrate 12 has a periodic wave-like structure. In other words, the periodic wave-like structure is an undulating structure, that is, an uneven structure.

That is, in the structure 10 of the illustrated example, the reflective layer 14 is a layer having a cholesteric liquid crystal structure and a structure in which the angle formed between the helical axis and the surface of the substrate 12 periodically changes. In other words, the reflective layer 14 is a layer having a cholesteric liquid crystal structure, in which the cholesteric liquid crystal structure gives a stripe pattern of the bright portions 16 and the dark portions 18 in the cross-sectional view observed by SEM, and therefore the angle formed between the normal lines of the bright portions 16 and the dark portions 18 and the surface of the substrate 12 periodically changes.

Here, in the structure 10 according to the embodiment of the present invention, since the cholesteric liquid crystalline phase has alignment defect portions 20, at least a part of the lines formed by the bright portions 16 and the lines formed by the dark portions 18 in the cross section of the reflective layer 14 is discontinuous.

Although not shown in FIG. 1, the lines formed by the bright portions 16 and the lines formed by the dark portions 18 in the cross section of the reflective layer 14 are also discontinuous in the defect portion (dislocation or the like) of the cholesteric liquid crystalline phase, in addition to the alignment defect portions 20. Specifically, the defect portion of the cholesteric liquid crystalline phase is a portion where the lines formed by the bright portions 16 and the lines formed by the dark portions 18 are interrupted in the cross section of the reflective layer 14.

In the present invention, the occurrence of glare in a case where the structure according to the embodiment of the present invention is used for a transparent screen or the like is reduced by the configuration having a portion where the lines formed by the bright portions 16 and the lines formed by the dark portions 18 are discontinuous as described above. This will be described in detail later.

In the reflective layer 14, that is, the cholesteric liquid crystal layer, two repetitions of the bright portions 16 and the dark portions 18 correspond to one pitch of the helix. From this, the helical pitch of the cholesteric liquid crystal layer, that is, the reflective layer 14 can be measured from a SEM cross-sectional view.

The two repetitions of the bright portions 16 and the dark portions 18 are three bright portions and two dark portions. In addition, the one pitch of the helix is, in other words, one turn of the helix.

Figure 2:
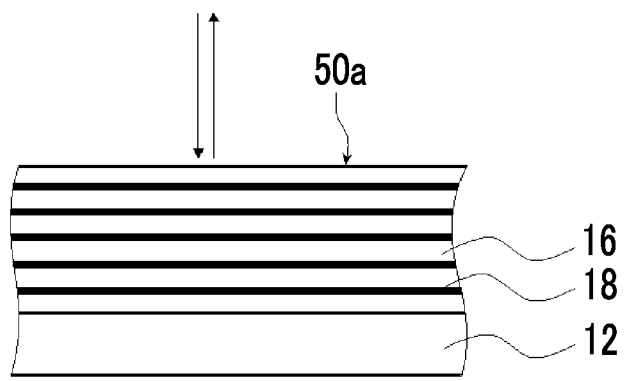
FIG. 2 is a conceptual diagram for explaining reflection of a cholesteric liquid crystal layer.

FIG. 2 conceptually shows a cross section of a general cholesteric layer.

As described above, as shown in FIG. 2, a stripe pattern of the bright portions 16 and the dark portions 18 is usually observed in the cross section of a cholesteric liquid crystal layer 50a formed on the substrate 12.

Generally, the stripe pattern (layered structure) of the bright portions 16 and the dark portions 18 is formed so as to be parallel to the surface of the substrate 12 which is a formation surface, as shown in FIG. 2. The cholesteric liquid crystal layer exhibits specular reflectivity on a plane orthogonal to the helical axis. Therefore, in a case of such an aspect, the cholesteric liquid crystal layer 50a in which the cholesteric liquid crystalline phase is immobilized exhibits specular reflectivity. That is, in a case where light is incident from a normal direction of the cholesteric liquid crystal layer 50a, the light is reflected in the normal direction, but the light is hardly reflected in an oblique direction, which results in poor diffuse reflectivity (see the arrows in FIG. 2).

Figure 3:
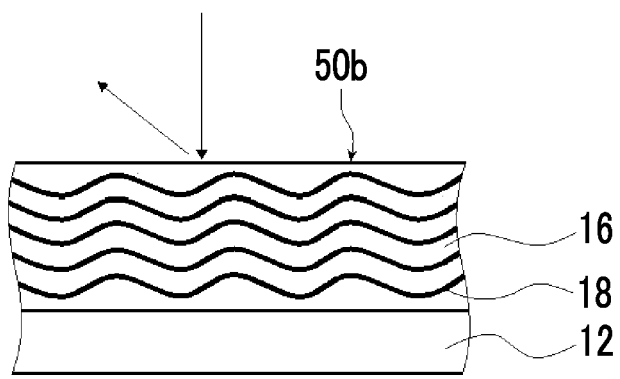
FIG. 3 is a conceptual diagram for explaining the reflection of the cholesteric liquid crystal layer.

On the other hand, like a cholesteric liquid crystal layer 50b conceptually showing the cross section thereof in FIG. 3, in a case where the formation surface (substrate 12) is a flat surface, and the stripe patterns of the bright portions 16 and the dark portions 18, that is, the lines formed by the bright portions 16 and the lines formed by the dark portions 18 have a wave-like structure (undulating structure), and then in a case where light is incident from the normal direction of the cholesteric liquid crystal layer 50b, a portion of the incident light is reflected in an oblique direction because there is a region where the helical axis of the liquid crystal compound is inclined (see the arrows in FIG. 3).

That is, in the cholesteric liquid crystal layer formed by immobilizing a cholesteric liquid crystalline phase, the lines formed by the bright portions 16 and the lines formed by the dark portions 18 have a wave-like structure, whereby a cholesteric liquid crystal layer having high diffuse reflectivity can be realized. In addition, the diffuse reflectivity becomes better as the unevenness of the wave-like structure of the bright portions 16 and the dark portions 18 is larger.

In the following description, the "wave-like structure of lines formed by bright portions and lines formed by dark portions" in the cross section of the cholesteric liquid crystal layer is also simply referred to as a "wave-like structure".

As will be described later, as an example, the cholesteric liquid crystal layer having a wave-like structure can be formed by applying a composition containing a liquid crystal compound and a chiral agent onto a surface on which the cholesteric liquid crystal layer will be formed, heating the composition to align the liquid crystal compound into a cholesteric liquid crystalline phase, and then cooling the composition and immobilizing the cholesteric liquid crystalline phase by ultraviolet irradiation or the like.

As described above, in a case where the structure has a plurality of cholesteric layers and then in a case where cholesteric liquid crystal layers are formed on the cholesteric liquid crystal layer having a wave-like structure, the upper cholesteric liquid crystal layer also has the same wave-like structure, following the wave-like structure of the lower cholesteric liquid crystal layer. That is, in a case where the structure has a plurality of cholesteric layers and then in a case where cholesteric liquid crystal layers are formed on the cholesteric liquid crystal layer having a wave-like structure, the upper cholesteric liquid crystal layer also has the same wave-like structure, following the wave-like structure of the lower cholesteric liquid crystal layer.

Furthermore, the larger the unevenness of the wave-like structure of the lower cholesteric liquid crystal layer, the larger the unevenness of the wave-like structure of the upper cholesteric liquid crystal layer. The fact that the unevenness of the wave-like structure of the cholesteric liquid crystal layer is large indicates that the wave height is high and the wave period is short.

In the structure 10 according to the embodiment of the present invention, the wave-like structure in the cross section of the reflective layer 14 has a substantially uniform wave period, but the wave height may vary.

For example, the structure 10 according to the embodiment of the present invention may be configured such that the wave height is the highest in the central region in the thickness direction of the reflective layer 14, and gradually decreases toward the upper side (surface side) and the substrate 12 side in the thickness direction. That is, the structure 10 according to the embodiment of the present invention may be configured such that the amplitude of the wave-like structure in the cross section of the reflective layer 14 is the largest in the central region in the thickness direction, and gradually decreases toward the surface side and the substrate 12 side.

Alternatively, the structure 10 according to the embodiment of the present invention may be a structure having waves having a uniform height throughout the thickness direction, such as a wave-like structure of the cholesteric liquid crystal layer 50b shown in FIG. 3.

In the structure 10 of the illustrated example, the surface 24 of the reflective layer 14 may be planar or may have an uneven structure as shown in FIG. 1. The surface 24 of the reflective layer 14 is an interface with air or an interface with an upper layer.

The reflective layer 14 having unevenness on the surface 24 has a wave height of the wave-like structure in the cross section of the reflective layer 14 larger than that of the cholesteric liquid crystal layer having a flat surface. Therefore, the reflective layer 14 having an uneven structure on the surface 24 is capable of achieving higher diffuse reflectivity.

In a case where the surface 24 of the reflective layer 14 has an uneven structure, the uneven structure of the surface 24 is generally periodic (substantially periodic). In addition, in a case where the surface 24 of the reflective layer 14 has an uneven structure, the uneven structure of the surface 24 generally has a phase of the unevenness opposite to the wave-like structure of bright portions and dark portions of the cross section, as shown in FIG. 1.

Specifically, the phase of the unevenness on the surface 24 of the reflective layer 14 is shifted by half (approximately half) with respect to the wave-like structure in the cross section. Therefore, in the planar direction of the substrate 12, the position of the convex portion of the wave-like structure in the cross section of the reflective layer 14 is the position of the concave portion of the unevenness on the surface 24 of the reflective layer 14, and the position of the concave portion of the wave-like structure in the cross section of the reflective layer 14 is the position of the convex portion of the unevenness on the surface 24 of the reflective layer 14.

Further, as shown in FIG. 1, in the reflective layer 14, a period C1 of the wave-like structure in the cross section is basically equal to a period C2 of the unevenness on the surface 24. That is, in the reflective layer 14, the period of the wave-like structure in the cross section is equal to the period of the unevenness on the surface 24.

As shown in FIG. 1, the period C1 is an interval between the vertices of the waves of the dark portions 18 closest to the surface 24 of the reflective layer 14, and the period C2 is an interval between the vertices of the convex portions on the surface 24 of the reflective layer 14.

In addition, in the present invention, the fact that the period C1 and the period C2 are equal to each other includes not only a case where the period C1 and the period C2 are completely identical, but also a case where the period difference calculated by "[(C1−C2)/C1]×100" is ±30% or less.

As described above, in order to obtain high diffuse reflectivity in the reflective layer 14, it is preferable to narrow the period C1 of the wave-like structure and to make the wave of the wave-like structure in the cross section large (high). Here, the state of the unevenness on the surface 24 of the reflective layer 14 is greatly influenced by the wave-like structure of the cross section. Therefore, in order to obtain satisfactory diffuse reflectivity in the reflective layer 14, it is preferable to narrow the period C2 of the unevenness on the surface and to increase (deepen) the height h of the unevenness. In particular, as the height h of the unevenness becomes higher, it tends to obtain higher diffuse reflectivity.

However, in a case where the period C2 of the unevenness on the surface 24 of the reflective layer 14, that is, the period C1 of the wave-like structure of the cross section is narrowed, the height h of the unevenness tends to decrease. On the contrary, in a case where the height h of the unevenness on the surface 24 is increased, the period C2 of the unevenness, that is, the period C1 of the wave-like structure tends to be narrowed.

Considering this point, the period C1 of the wave-like structure of the reflective layer 14 is preferably 0.3 to 10 μm and more preferably 1 to 6 μm. In the reflective layer 14, the period C2 of the unevenness on the surface 24 and the period C1 of the wave-like structure in the cross section are basically the same as described above.

The height h of the unevenness on the surface 24 of the reflective layer 14 is preferably 1 to 500 nm and more preferably 5 to 300 nm.

Such a reflective layer 14 having an uneven structure on the surface 24 can be formed by carrying out at least one of selection of a chiral agent and/or an alignment control agent or selection of conditions for a heating treatment or a cooling treatment in a production method which will be described later.

In the structure 10 according to the embodiment of the present invention, the wave-like structure in the cross section of the reflective layer 14 is formed not only in a horizontal direction in FIG. 1 (FIG. 3) but also, for example, in a cross section in the direction perpendicular to the plane of paper in FIG. 1. That is, the wave-like structure of the reflective layer 14 is two-dimensionally formed in the surface direction of the reflective layer 14, and the wave-like structure is recognized in the reflective layer 14 in the cross sections in all directions. As described above, the wave-like structure in the cross section of the reflective layer 14 is a wave-like structure of the bright portions 16 and the dark portions 18.

However, the present invention is not limited thereto, and the reflective layer 14 may have a wave-like structure formed such that continuous waves travel only in one direction in the cross section. From the viewpoint of the diffuse reflectivity, the reflective layer 14 is preferably such that the wave-like structure is recognized in the cross sections in all directions as described above.

Regarding this point, the same applies to the unevenness of the surface of the reflective layer 14.

In the structure 10 according to the embodiment of the present invention, the reflective layer 14 is formed by immobilizing a cholesteric liquid crystalline phase, and the reflective layer 14 is such that the lines formed by the bright portions 16 and the lines formed by the dark portions 18 have a wave-like structure in the cross section, and at least a part of the lines formed by the bright portions 16 and the lines formed by the dark portions 18 is discontinuous. In the illustrated example, at least a part of the lines formed by the bright portions 16 and the lines formed by the dark portions 18 is discontinuous since the reflective layer 14 has the alignment defect portions 20 of the cholesteric liquid crystalline phase.

By having such a structure, the structure 10 according to the embodiment of the present invention reduces the occurrence of glare in a case of being used as, for example, a transparent screen, in addition to having satisfactory diffuse reflectivity (non-specular reflectivity) and transparency.

As described above, a reflective layer (cholesteric liquid crystal layer) formed by immobilizing a cholesteric liquid crystalline phase usually has a specular reflectivity, but as described in JP2001-002797A, diffuse reflectivity can be obtained by making a reflection axis, that is, a helical axis non-uniform.

However, in the configuration in which the reflection axis is made non-uniform, strong scattering occurs even in a wavelength range other than the wavelength reflected by the interference phenomenon. Therefore, for example, in an application such as a transparent screen, there is a problem that opacity increases in all wavelength ranges.

On the other hand, as shown in FIG. 3, in the reflective layer having a wave-like structure in which the direction of the reflection axis, that is, the helical axis continuously changes, there is little scattering in a wavelength range other than the wavelength reflected by the interference phenomenon, and therefore opacity is difficult to increase.

However, since the reflective layer, in which the lines formed by the bright portions and the lines formed by the dark portions derived from the cholesteric liquid crystalline phase have a wave-like structure, has a wave-like periodic structure in an in-plane direction, as shown in FIG. 3, a strong diffraction phenomenon occurs due to this periodic structure. Therefore, there is a problem that glare occurs in the projected image, for example, in an application such as a screen.

On the other hand, in the structure 10 of the illustrated example, the reflective layer 14 has a wave-like structure, and at least a part of the lines formed by the bright portions 16 and the lines formed by the dark portions 18 is discontinuous. Thereby, the structure 10 can reduce the continuity and regularity of the periodic structure due to the wave-like structure in the in-plane direction of the reflective layer 14, and therefore can prevent the occurrence of a strong diffraction phenomenon due to the wave-like periodic structure.

Therefore, for example, in a case of being used for an application such as a transparent screen, the structure 10 according to the embodiment of the present invention has satisfactory diffuse reflectivity and transparency and also reduces the occurrence of glare in the projection light, and therefore can achieve both visibility of the background and satisfactory observation of the projection light.

In the present invention, the in-plane direction of the reflective layer 14 is a direction that coincides with the surface direction of the main surface of the reflective layer 14, that is, a direction in which the thickness direction is a perpendicular line. The main surface is a maximum surface of a layer (a sheet-like material, a plate-like material, or a film).

In the reflective layer 14 of the structure 10, the portion where the lines formed by the bright portions 16 and the lines formed by the dark portions 18 are discontinuous may be at least a part, that is, at least one portion; but the number of the portions where the lines formed by the dark portions 18 are discontinuous is preferably 0.05 or more, more preferably 0.1 or more, still more preferably 0.15 or more, and particularly preferably 0.2 or more per 1 $\mu m^2$ of the cross section of the reflective layer 14.

In the following description, the portion where the lines formed by the bright portions 16 are discontinuous and the portion where the lines formed by the dark portions 18 are discontinuous are also referred to as "discontinuous points". In particular, the portion where the lines formed by the dark portions 18 are discontinuous is also referred to as a "discontinuous point of the dark portions 18".

By setting the number of discontinuous points of the dark portions 18 to 0.05 or more per 1 $\mu m^2$ of the cross section of the reflective layer 14, for example, the occurrence of glare in a case where a laminate 10 is used for a transparent screen or the like can be suitably reduced. By setting the number of discontinuous points of the dark portions 18 per 1 µm² of the cross section of the reflective layer 14 to more preferably 0.1 or more, still more preferably 0.15 or more, and particularly preferably 0.2 or more, the occurrence of glare in a case where the laminate 10 is used for a transparent screen or the like can be more suitably reduced.

The number of discontinuous points of the dark portions 18 is preferably 1 or less and more preferably 0.5 or less per 1 µm² of the cross section of the reflective layer 14.

By setting the number of discontinuous points of the dark portions 18 to 1 or less per 1 µm² of the cross section of the reflective layer 14, it is preferable from the viewpoint of maintaining high transparency.

In the present invention, the discontinuous points of the dark portions 18 are counted by taking a portion where the lines formed by the dark portions 18 are interrupted as one place.

Specifically, the number of discontinuous points of the dark portions 18 per 1 µm² of the cross section of the reflective layer 14 can be determined, for example, by observing the cross section of the reflective layer 14 with SEM, selecting any 20 regions of 100 µm² in the cross section, counting the number of discontinuous points of the dark portions 18 in each region, and then dividing the average thereof by the area to obtain the number of discontinuous points of the dark portions 18 per 1 µm² of the cross section of the reflective layer 14. In other words, the discontinuous point of the dark portions 18 is a portion where the lines formed by the dark portions 18 are interrupted.

As described above, the reflective layer 14 is a layer having a wave-like structure and formed by immobilizing a cholesteric liquid crystalline phase. In the reflective layer 14 having such a wave-like structure, discontinuous points can basically be formed by causing alignment defects in the cholesteric liquid crystalline phase.

As will be described later, the reflective layer 14 formed by immobilizing a cholesteric liquid crystalline phase and having a wave-like structure is formed as follows as an example.

First, a composition (liquid crystal composition) containing a liquid crystal compound, a chiral agent, and an alignment control agent is prepared. Subsequently, the prepared composition is applied onto the substrate 12 (surface on which a reflective layer is formed). Further, the liquid crystal compound is aligned into a cholesteric liquid crystalline phase state by heating the applied composition. Then, the reflective layer 14 is formed by cooling or heating the composition and, where appropriate, crosslinking the composition by ultraviolet irradiation or the like.

Here, in the formation of a reflective layer formed by immobilizing a cholesteric liquid crystalline phase and having a wave-like structure, the composition is applied to the substrate 12, usually after carrying out an alignment treatment such as rubbing for imparting horizontal alignment controllability to the substrate 12 (surface on which a reflective layer is formed).

On the other hand, the reflective layer 14 having a wave-like structure and having discontinuous points can be formed by applying the composition onto the substrate 12 without carrying out the alignment treatment to form the reflective layer 14. That is, it is possible to form the reflective layer 14 having a wave-like structure and having discontinuous points by making the horizontal alignment control at the interface of the substrate 12 weak.

In the formation of the cholesteric liquid crystalline phase, the alignment of the liquid crystal compound is various at the beginning of application of the composition, and the whole thereof is in a state of alignment defects. Therefore, in a case where the alignment treatment is not carried out on the substrate 12, the liquid crystal compound is difficult to be aligned into a cholesteric liquid crystalline phase, and the liquid crystal compound faces in various directions, which results in the formation of a portion where the liquid crystal compound is not properly aligned into a cholesteric liquid crystalline phase occurs. Such a portion becomes an alignment defect. As a result, it is possible to form the reflective layer 14 having a wave-like structure and having discontinuous points.

As another method, a method of adding a vertical alignment agent for vertically aligning a liquid crystal compound as an alignment control agent to the composition for forming the reflective layer 14 is exemplified. That is, it is possible to form the reflective layer 14 having a wave-like structure and having discontinuous points by weakening the horizontal alignment control at the air interface of the composition (coating film).

As described above, in a case where the reflective layer 14 is formed, the substrate 12 is subjected to a rubbing treatment or the like to impart an alignment regulating force to the substrate 12. Here, in a case where the composition for forming the reflective layer 14 contains a vertical alignment agent, the liquid crystal compound tends to be aligned in the vertical direction at the air interface of the composition and therefore distortion occurs in the composition, which results in an alignment defect. As a result, it is possible to form the reflective layer 14 having a wave-like structure and having discontinuous points.

A horizontal alignment agent for horizontally aligning a liquid crystal compound as will be described below as an alignment control agent is usually added to the composition for forming the reflective layer 14; but in this method of adding a vertical alignment agent, it is preferable to add only the vertical alignment agent without adding the horizontal alignment agent.

Examples of the vertical alignment agent include fluorine-based polymers (for example, those described in paragraphs [0074] to [0120] of JP2007-248621A), fluorine-containing compounds (for example, those described in paragraphs [0122] to [0146] of JP2007-248621A), onium salts (for example, those described in paragraphs [0155] to [0189] of JP2013-235234A), cellulose materials (for example, those described in JP05301083B), and phosphine compounds (for example, those described in JP5655113B).

Furthermore, as another method, a method of adding particles (foreign matter) to the composition for forming the reflective layer 14 and dispersing the particles in the reflective layer 14 is exemplified.

As described above, in the formation of the cholesteric liquid crystalline phase, at the beginning of applying the composition, the alignment of the liquid crystal compound is various, and the whole thereof is in a state of alignment defects. The liquid crystal compound in the composition is gradually aligned into a state of a cholesteric liquid crystalline phase from the vicinity of the substrate 12 given horizontal alignment by rubbing or the like upward. Here, the liquid crystal compound is not properly aligned at the position where the particles are present, and is stabilized in a state of alignment defects. As a result, it is possible to form the reflective layer 14 having a wave-like structure and having discontinuous points.

The particle size (particle diameter) of the particles added to the composition, that is, the reflective layer 14 is not limited, but particles having a particle size smaller than the helical pitch of the cholesteric liquid crystalline phase (one helical pitch) are preferable. The addition of the particles may cause an increase in haze of the structure 10. On the other hand, an increase in haze of the structure 10 can be suppressed by making the particle diameter of the particles to be added smaller than the helical pitch of the cholesteric liquid crystalline phase.

The content of the particles in the reflective layer 14 is also not limited, but is preferably 2% by mass or less.

There is also no restriction on the material for forming the particles to be added, and various particles can be used as long as sufficient transparency of the reflective layer 14 can be secured.

Examples thereof include oxide-based nanoparticles, nanodiamonds, silver nanoparticles, and polymer-based nanoparticles. Examples of the oxide-based nanoparticles include silica sol, zirconium oxide, zinc oxide, titanium oxide, titanium oxynitride, and indium tin oxide (ITO). Examples of the polymer-based nanoparticles include polystyrene, acrylic resin, and melamine.

A method of not subjecting the substrate 12 to an alignment treatment, a method of adding a vertical alignment agent to the composition for forming the reflective layer 14, and a method of adding particles (foreign matter) to the composition for forming the reflective layer 14, as described above for forming discontinuous points, may be used in combination of two or more thereof.

The thickness of the reflective layer 14 is not limited, and the thickness satisfying the diffuse reflectivity required for the reflective layer 14 may be set as appropriate according to the size in the surface direction of the reflective layer 14, the material for forming the reflective layer 14, and the like.

The thickness of the reflective layer 14 is preferably 0.3 to 20 µm and more preferably 0.5 to 10 µm. By setting the thickness of the reflective layer 14 to 0.3 µm or more, satisfactory diffuse reflectivity can be obtained by the reflective layer 14 having a sufficient thickness. In addition, by setting the thickness of the reflective layer 14 to 20 µm or less, the reflective layer 14 can be prevented from becoming unnecessarily thick, and for example, a projected image display member described later can be thinned.

As described above, in a case where a plurality of reflective layers are provided on the substrate 12, the thickness per layer is preferably within this range. The thickness of the cholesteric liquid crystal layer having no unevenness on the surface 24 is also preferably within this range.

As described above, the structure 10 is configured to have the reflective layer 14 in which the lines formed by the bright portions 16 and the lines formed by the dark portions 18 in the cross section have a wave-like structure on the substrate 12, and at least a part of the lines formed by the bright portions 16 and the lines formed by the dark portions 18 is discontinuous.

In the structure 10, the substrate 12 is a plate-like material for supporting the reflective layer 14 (composition for forming the reflective layer 14).

The substrate 12 preferably has no tint (color) and has a total light transmittance of 70% or more. In other words, having no color refers to an achromatic color. That is, the substrate 12 is preferably colorless and transparent. In addition, the total light transmittance of the substrate 12 is more preferably 80% or more and still more preferably 90% or more.

In the present invention, the total light transmittance may be measured in accordance with JIS K 7361 using a commercially available measuring device such as NDH 5000 or SH-4000 (manufactured by Nippon Denshoku Industries Co., Ltd.).

The material constituting the substrate 12 is not particularly limited, and examples thereof include various resin materials such as a cellulose-based polymer, a polycarbonate-based polymer, a polyester-based polymer, a (meth) acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate 12 may contain various additives such as an ultraviolet (UV) absorber, a matting agent fine particle, a plasticizer, a deterioration inhibitor, and a release agent. Further, the substrate 12 may have a layer such as an alignment layer on the surface thereof.

In addition, the substrate preferably has low birefringence in the visible light region. For example, the phase difference at a wavelength of 550 nm of the substrate is preferably 50 nm or less and more preferably 20 nm or less.

The thickness of the substrate 12 is not particularly limited, but it is preferably 10 to 200 µm and more preferably 20 to 100 µm from the viewpoint of thinning and handleability.

As described above, in the structure 10 of the illustrated example, the reflective layer 14 has a wave-like structure, but the surface of the substrate 12 on which the reflective layer 14 is formed has not an uneven structure or a wave-like structure, but has a flat surface.

As described above, the substrate 12 is provided with the reflective layer 14 in which the lines formed by the bright portions 16 and the lines formed by the dark portions 18 in the cross section have a wave-like structure, and at least a part of the lines formed by the bright portions 16 and the lines formed by the dark portions 18 is discontinuous.

As described above, the reflective layer 14 is a layer formed by immobilizing a cholesteric liquid crystalline phase, has wavelength selectivity for reflection, and reflects left circularly polarized light or right circularly polarized light.

The selective reflection central wavelength (central wavelength $\lambda$ of selective reflection) of the reflective layer 14 in which a cholesteric liquid crystalline phase is immobilized depends on the pitch P of the helical structure (=the period of the helix) in the cholesteric liquid crystalline phase and follows the relationship of the average refractive index n of the reflective layer 14 (cholesteric liquid crystalline phase) and $\lambda = n \times P$.

Here, the central wavelength $\lambda$ of the selective reflection of the reflective layer 14 means a wavelength at the center position of the reflection peak of the circularly polarized light reflection spectrum measured from the normal direction of the reflective layer 14. As can be seen from the above expression, the central wavelength of the selective reflection can be adjusted by adjusting the pitch of the helical structure. That is, by adjusting the n value and the P value, for example, in order to selectively reflect either the right circularly polarized light or the left circularly polarized light with respect to the blue light, the central wavelength $\lambda$ is adjusted such that an apparent central wavelength of the selective reflection can be set to a wavelength range of 420 nm or longer and shorter than 500 nm. Incidentally, the apparent central wavelength of the selective reflection refers to a wavelength at the center position of the reflection peak of the circularly polarized light reflection spectrum of the reflective layer 14 measured from the observation direction in practical use. The phrase "in practical use" refers to, for example, a case of being used as a projected image display member.

Since the pitch of the cholesteric liquid crystalline phase depends on the type of the chiral agent to be used together with the liquid crystal compound or the addition concentration thereof, a desired pitch can be obtained by adjusting these factors.

The reflected light of the reflective layer 14 formed by immobilizing a cholesteric liquid crystalline phase is circularly polarized light. That is, the structure 10 according to the embodiment of the present invention reflects circularly polarized light. Whether the reflected light is right circularly polarized light or left circularly polarized light depends on the twist direction of the helix of the cholesteric liquid crystalline phase. The selective reflection of circularly polarized light by the cholesteric liquid crystalline phase reflects right circularly polarized light in a case where the twist direction of the helix of the cholesteric liquid crystalline phase is right-handed, and reflects left circularly polarized light in a case where the twist direction of the helix of the cholesteric liquid crystalline phase is left-handed.

The direction of rotation of the cholesteric liquid crystalline phase can be adjusted by the type of liquid crystal compound for forming the reflective layer 14 or the type of chiral agent added.

With respect to a method for measuring the twist direction (sense) or pitch of the helix, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

The reflective layer 14 is a layer formed by immobilizing a cholesteric liquid crystalline phase. For example, such a reflective layer 14 can be formed by preparing a composition containing a liquid crystal compound and a chiral agent, applying and drying the composition, and curing the composition as necessary to immobilize the cholesteric liquid crystalline phase. The reflective layer 14 is particularly preferably formed of a polymer material that is three-dimensionally crosslinked by polymerizing a liquid crystal compound having two or more polymerizable groups.

(Liquid Crystal Compound)

The type of the liquid crystal compound is not particularly limited.

Generally, liquid crystal compounds can be classified into a rod type (rod-like liquid crystal compound) and a disc type (discotic liquid crystal compound, disk-like liquid crystal compound) depending on the shape thereof. Further, the rod type and the disk type each have a low molecular weight type and a high molecular weight type. The high molecular weight generally refers to having a degree of polymerization of 100 or more (Polymer Physics-Phase Transition Dynamics, Masao Doi, page 2, Iwanami Shoten, 1992). Any liquid crystal compound can be used in the present invention. Two or more liquid crystal compounds may be used in combination.

The liquid crystal compound may have a polymerizable group. The type of the polymerizable group is not particularly limited, and a functional group capable of addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

The number of polymerizable groups is not particularly limited, but is preferably 2 or more. The upper limit of the number of polymerizable groups is not particularly limited, but is often 8 or less.

The liquid crystal compound is preferably a liquid crystal compound represented by Formula (I) from the viewpoint that the reflective layer 14 has superior diffuse reflectivity.

Among these, from the viewpoint of superior diffuse reflectivity of the reflective layer 14, in a case where the number obtained by dividing the number of trans-1,4-cyclohexylene groups which may have a substituent represented by A by m is defined as mc, a liquid crystal compound satisfying mc>0.1 is preferable, and a liquid crystal compound satisfying 0.4≤mc≤0.8 is more preferable.

Note that mc is a number represented by the following calculating expression.

$$mc=(\text{the number of trans-1,4-cyclohexylene groups which may have a substituent represented by } A)/m$$

$$Q^1-Sp^1-(A-L)_{\overline{m}}Sp^2-Q^2 \qquad (I)$$

In the formula,

A represents a phenylene group which may have a substituent or a trans-1,4-cyclohexylene group which may have a substituent, at least one of A's represents a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=N—N=CH—, —CH=CH—, —C≡C—, —NHC(=O)—, —C(=O)NH—, —CH=N—, —N=CH—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, and Q$^1$ and Q$^2$ each independently represent a hydrogen atom or a polymerizable group selected from the group consisting of groups represented by Formulae (Q-1) to (Q-5), provided that one of Q$^1$ and Q$^2$ represents a polymerizable group.

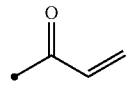

(Q-1)

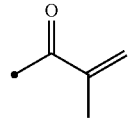

(Q-2)

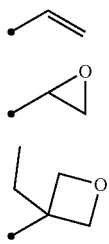

A is a phenylene group which may have a substituent or a trans-1,4-cyclohexylene group which may have a substituent. In the present specification, the phenylene group is preferably a 1,4-phenylene group.

At least one of A's is a trans-1,4-cyclohexylene group which may have a substituent.

m pieces of A's may be the same as or different from each other.

m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, a halogen atom, and a group formed by combining two or more of these substituents. Examples of the substituent include substituents represented by —C(=O)—$X^3$-$Sp^3$-$Q^3$ which will be described later. The phenylene group and the trans-1,4-cyclohexylene group may have 1 to 4 substituents. In a case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the foregoing alkyl group. Further, in the present specification, specific examples of the alkylene group in a case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and —C(=O)—$X^3$-$Sp^3$-$Q^3$. Here, $X^3$ represents a single bond, —O—, —S—, or —N($Sp^4$-$Q^4$)- or represents a nitrogen atom forming a ring structure together with $Q^3$ and $Sp^3$. $Sp^3$ and $Sp^4$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or —C(=O)O—.

$Q^3$ and $Q^4$ each independently represent a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, or any polymerizable group selected from the group consisting of groups represented by Formulae (Q-1) to (Q-5).

Specific examples of the group where one or two or more —$CH_2$— in a cycloalkyl group is substituted with —O—, —S—, —NH—, —N($CH_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of —$CH_2$O—, —O$CH_2$—, —($CH_2$)$_2$OC(=O)—, —C(=O)O($CH_2$)$_2$—, —C(=O)O—, —OC(=O)—, —OC(=O)O—, —CH=CH—C(=O)O—, and —OC(=O)—CH=CH—. L is preferably —C(=O)O— or —OC(=O)—. m pieces of L's may be the same as or different from each other.

$Sp^1$ and $Sp^2$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or —C(=O)O—. $Sp^1$ and $Sp^2$ are each independently preferably a linking group formed by combining one or two or more groups selected from the group consisting of a linear alkylene group having 1 to 10 carbon atoms to which a linking group selected from the group consisting of —O—, —OC(=O)—, and —C(=O)O— is bonded to both terminals thereof, —OC(=O)—, —C(=O)O—, —O—, and a linear alkylene group having 1 to 10 carbon atoms, and more preferably a linear alkylene group having 1 to 10 carbon atoms to which —O— is bonded to both terminals thereof.

$Q^1$ and $Q^2$ each independently represent a hydrogen atom or a polymerizable group selected from the group consisting of groups represented by Formulae (Q-1) to (Q-5), provided that either one of $Q^1$ and $Q^2$ represents a polymerizable group.

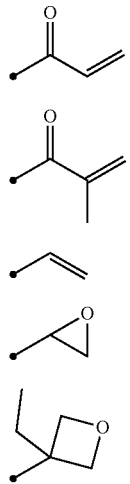

(Q-1)

(Q-2)

(Q-3)

(Q-4)

(Q-5)

The polymerizable group is preferably an acryloyl group (Formula (Q-1)) or a methacryloyl group (Formula (Q-2)).

Specific examples of the liquid crystal compound include a liquid crystal compound represented by Formula (I-11), a liquid crystal compound represented by Formula (I-21), and a liquid crystal compound represented by Formula (I-31). In addition to the foregoing compounds, known compounds such as a compound represented by Formula (I) in JP2013-112631A, a compound represented by Formula (I) in JP2010-070543A, a compound represented by Formula (I) in JP2008-291218A, a compound represented by Formula (I) in JP4725516B, a compound represented by Formula (II) in JP2013-087109A, a compound described in paragraph [0043] of JP2007-176927A, a compound represented by Formula (1-1) in JP2009-286885A, a compound represented by Formula (I) in WO2014/10325A, a compound represented by Formula (1) in JP2016-081035A, and a compound represented by Formulae (2-1) and (2-2) in JP2016-121339A can be mentioned.

A liquid crystal compound represented by Formula (I-11)

$Z^{11}$ and $Z^{12}$ each independently represent a single bond, —O—, —NH—, —N(CH$_3$)—, —S—, —C(=O)O—, —OC(=O)—, —OC(=O)O—, or —C(=O)NR$^{12}$ $R^{12}$ represents a hydrogen atom or -Sp$^{12}$-Q$^{12}$, $Sp^{11}$ and $Sp^{12}$ each independently represent a single bond, a linear or branched alkylene group having 1 to 12 carbon atoms which may be substituted with $Q^{11}$, or a linking group obtained by substituting one or more —CH$_2$— in a linear or branched alkylene group having 1 to 12 carbon atoms which may be substituted with $Q^{11}$ with —O—, —S—, —NH—, —N($Q^{11}$)-, or —C(=O)—, $Q^{11}$ represents a hydrogen atom, a cycloalkyl group, a group where one or more —CH$_2$— in a cycloalkyl group is substituted with —O—, —S—, —NH—, —N(CH$_3$)—, —C(=O)—, —OC(=O)—, or —C(=O)O—, or a polymerizable group selected from the group consisting of groups represented by Formulae (Q-1) to (Q-5), $Q^{12}$ represents a hydrogen atom or a polymerizable group selected from the group consisting of groups represented by Formulae (Q-1) to (Q-5), $l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^{12}$'s, a plurality of $l^{11}$'s, a plurality of $Z^{11}$'s, a plurality of $Sp^{11}$'s, and a plurality of $Q^{11}$'s may be respectively the same as or different from each other.

The liquid crystal compound represented by Formula (I-11) contains at least one —Z$^{12}$—Sp$^{12}$-Q$^{12}$ in which $Q^{12}$ is a polymerizable group selected from the group consisting of groups represented by Formulae (Q-1) to (Q-5), as $R^{11}$.

In addition, in the liquid crystal compound represented by Formula (I-11), preferred is —Z$^{11}$-Sp$^{11}$-Q$^{11}$ in which $Z^{11}$ is —C(=O)O— or C(=O)NR$^{12}$— and $Q^{11}$ is a polymerizable group selected from the group consisting of groups represented by Formulae (Q-1) to (Q-5). In addition, in the liquid crystal compound represented by Formula (I-11), $R^{11}$ is preferably —Z$^{12}$—Sp$^{12}$-Q$^{12}$ in which $Z^{12}$ is —C(=O)O— or C(=O)NR$^{12}$—, and $Q^{12}$ is a polymerizable group selected from the group consisting of groups represented by Formulae (Q-1) to (Q-5).

The 1,4-cyclohexylene group contained in the liquid crystal compound represented by Formula (I-11) is a trans-1,4-cyclohexylene group.

A suitable aspect of the liquid crystal compound represented by Formula (I-11) may be, for example, a compound

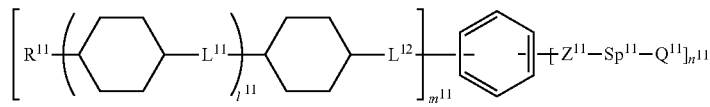

(I-11)

In the formula, $R^{11}$ represents a hydrogen atom, a linear or branched alkyl group having 1 to 12 carbon atoms, or —Z$^{12}$-Sp$^2$-Q$^{12}$, $L^{11}$ represents a single bond, —C(=O)O—, or —O(C=O)—, $L^{12}$ represents —C(=O)O—, —OC(=O)—, or —CONR$^2$—

$R^2$ represents a hydrogen atom or an alkyl group having 1 to 3 carbon atoms, in which $L^{11}$ is a single bond, $l^{11}$ is 1 (a dicyclohexyl group), and $Q^{11}$ is a polymerizable group selected from the group consisting of groups represented by Formulae (Q-1) to (Q-5).

Another suitable aspect of the liquid crystal compound represented by Formula (I-11) may be, for example, a compound in which $m^{11}$ is 2, $l^{11}$ is 0, and two $R^{11}$'s each represent —Z$^{12}$—Sp$^{12}$-Q$^{12}$, and $Q^{12}$ is a polymerizable group selected from the group consisting of groups represented by Formulae (Q-1) to (Q-5).

The liquid crystal compound represented by Formula (I-21)

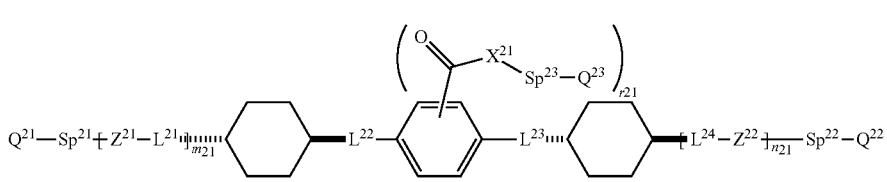

(I-21)

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of —CO—$X^{21}$-$Sp^{23}$-$Q^{23}$, an alkyl group, and an alkoxy group, m21 represents an integer of 1 or 2, and n21 represents an integer of 0 or 1, in a case where m21 represents 2, n21 represents 0, in a case where m21 represents 2, two $Z^{21}$'s may be the same or different, at least one of $Z^{21}$ or $Z^{22}$ is a phenylene group which may have a substituent, $L^{21}$, $L^{22}$, $L^{23}$, and $L^{24}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $X^{21}$ represents —O—, —S—, or —N($Sp^{25}$-$Q^{25}$)- or represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, $Q^{21}$ and $Q^{22}$ each independently represent a polymerizable group selected from the group consisting of groups represented by Formulae (Q-1) to (Q-5), $Q^{23}$ represents a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, any one polymerizable group selected from the group consisting of groups represented by Formulae (Q-1) to (Q-5), or a single bond in a case where $X^{21}$ is a nitrogen atom forming a ring structure together with $Q^{23}$ and $Sp^{23}$, and $Q^{25}$ represents a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any one polymerizable group selected from the group consisting of groups represented by Formulae (Q-1) to (Q-5), provided that in a case where $Sp^{25}$ is a single bond, $Q^{25}$ is not a hydrogen atom.

It is also preferred that the liquid crystal compound represented by Formula (I-21) has a structure in which a 1,4-phenylene group and a trans-1,4-cyclohexylene group are alternately present. For example, preferred is a structure in which m21 is 2, n21 is 0, and $Z^{21}$ is a trans-1,4-cyclohexylene group which may have a substituent or an arylene group which may have a substituent, each of which from the $Q^{21}$ side, or a structure in which m21 is 1, n21 is 1, $Z^{21}$ is an arylene group which may have a substituent, and $Z^{22}$ is an arylene group which may have a substituent.

A liquid crystal compound represented by Formula (I-31);

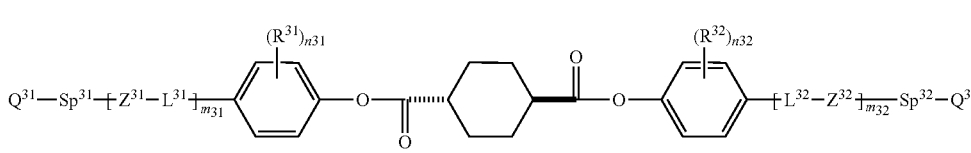

(I-31)

In the formula, $R^{31}$ and $R^{32}$ each independently represent an alkyl group, an alkoxy group, and a group selected from the group consisting of —C(=O)—$X^{31}$-$Sp^{33}$-$Q^{33}$, n31 and n32 each independently represent an integer of 0 to 4, $X^{31}$ represents a single bond, —O—, —S—, or —N($Sp^{34}$-$Q^{34}$)- or represents a nitrogen atom forming a ring structure together with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and —C(=O)—$X^{31}$-$Sp^{33}$-$Q^{33}$, m31 represents an integer of 1 or 2, and m32 represents an integer of 0 to 2, in a case where m31 and m32 represent 2, two $Z^{31}$'s and $Z^{32}$'s may be the same or different, $L^{31}$ and $L^{32}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—;

Q$^{31}$ and Q$^{32}$ each independently represent a polymerizable group selected from the group consisting of groups represented by Formulae (Q-1) to (Q-5), and Q$^{33}$ and Q$^{34}$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any one polymerizable group selected from the group consisting of groups represented by Formulae (Q-1) to (Q-5), provided that Q$^{33}$ may represent a single bond in a case of forming a ring structure together with X$^{31}$ and Sp$^{33}$, and Q$^{34}$ is not a hydrogen atom in a case where Sp$^{34}$ is a single bond.

As the liquid crystal compound represented by Formula (I-31), particularly preferable compounds include a compound in which Z$^{32}$ is a phenylene group and a compound in which m32 is 0.

It is also preferred that the compound represented by Formula (I) has a partial structure represented by Formula (II).

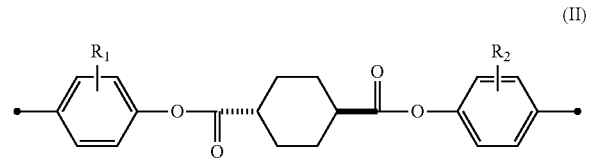

(II)

In Formula (II), black circles indicate the bonding positions with other moieties of Formula (I). It is sufficient that the partial structure represented by Formula (II) is included as a part of the partial structure represented by Formula (III) in Formula (I).

(III)

In the formula, R$^1$ and R$^2$ are each independently a group selected from the group consisting of a hydrogen atom, an alkyl group, an alkoxy group, and a group represented by —C(=O)—X$^3$-Sp$^3$-Q$^3$. Here, X$^3$ represents a single bond, —O—, —S—, or —N(Sp$^4$-Q$^4$)- or represents a nitrogen atom forming a ring structure together with Q$^3$ and Sp$^3$. X$^3$ is preferably a single bond or —O—. R$^1$ and R$^2$ are preferably —C(=O)—X$^3$-Sp$^3$-Q$^3$. It is also preferred that R$^1$ and R$^2$ are the same. The bonding position of each of R$^1$ and R$^2$ to the phenylene group is not particularly limited.

Sp$^3$ and Sp$^4$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—. Sp$^3$ and Sp$^4$ are each independently preferably a linear or branched alkylene group having 1 to 10 carbon atoms, more preferably a linear alkylene group having 1 to 5 carbon atoms, and still more preferably a linear chain alkylene group having 1 to 3 carbon atoms.

Q$^3$ and Q$^4$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any one polymerizable group selected from the group consisting of groups represented by Formulae (Q-1) to (Q-5).

It is also preferred that the compound represented by Formula (I) has, for example, a structure represented by Formula (II-2).

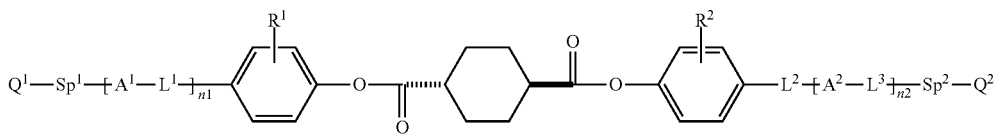

(II-2)

In the formula, A$^1$ and A$^2$ each independently represent a phenylene group which may have a substituent or a trans-1,4-cyclohexylene group which may have a substituent, and the above substituents are each independently 1 to 4 substituents selected from the group consisting of an alkyl group, an alkoxy group, and —C(=O)—X$^3$-Sp$^3$-Q$^3$, L$^1$, L$^2$, and L$^3$ each represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, and n1 and n2 each independently represent an integer of 0 to 9, and n1+n2 is 9 or less.

Each of Q$^1$, Q$^2$, Sp$^1$, and Sp$^2$ has the same definition as that of each group in Formula (I). Each of X$^3$, Sp$^3$, Q$^3$, R$^1$, and R$^2$ has the same definition as that of each group in Formula (II).

Examples of the liquid crystal compound represented by Formula (I) and satisfying 0.4≤mc≤0.8 include compounds described in paragraphs [0051] to [0054] of WO2016/047648A.

Two or more liquid crystal compounds may be used in combination. For example, two or more liquid crystal compounds represented by Formula (I) may be used in combination.

Among these, it is preferable to use a liquid crystal compound which is a liquid crystal compound represented by Formula (I) and satisfies 0.1<mc<0.3, together with the liquid crystal compound which is a liquid crystal compound represented by Formula (I) and satisfies 0.4≤mc≤0.8.

Examples of the liquid crystal compound represented by Formula (I) and satisfying 0.1<mc<0.3 include compounds described in paragraphs [0055] to [0058] of WO2016/047648A.

As the liquid crystal compound for use in the present invention, a compound represented by Formula (IV) and described in JP2014-198814A, in particular, a polymerizable liquid crystal compound having one (meth)acrylate group represented by Formula (IV) is also suitably used.

In Formula (V), n1 represents an integer of 3 to 6;
$R^{11}$ represents a hydrogen atom or a methyl group;
$Z^{12}$ represents —C(=O)— or —C(=O)—CH=CH—; and

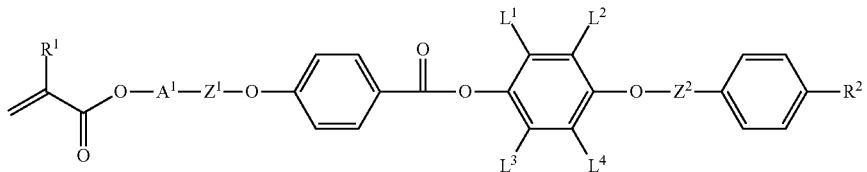

Formula (IV)

In Formula (IV), $A^1$ represents an alkylene group having 2 to 18 carbon atoms, in which one $CH_2$ in the alkylene group or two or more non-adjacent $CH_2$ may be substituted with —O—;

$Z^1$ represents —C(=O)—, —O—C(=O)—, or a single bond;

$Z^2$ represents —C(=O)— or —C(=O)—CH=CH—;

$R^1$ represents a hydrogen atom or a methyl group;

$R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (IV-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

—$Z^5$-T-Sp-P      Formula (IV-2)

In Formula (IV-2), P represents an acryloyl group, a methacryl group, or a hydrogen atom, and $Z^5$ represents a single bond, C(=O)O—, —OC(=O)—, —C(=O)NR$^1$— (where $R^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent, in which one $CH_2$ in the aliphatic group or two or more non-adjacent $CH_2$ may be substituted with —O—, —S—, —OC(=O)—, —C(=O)O—, or —OCOO—.

The compound represented by Formula (IV) is preferably a compound represented by Formula (V).

$R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

—$Z^{51}$-T-Sp-P      Formula (IV-3)

In Formula (IV-3), P represents an acryloyl group or a methacryl group;

$Z^{51}$ represents —C(=O)O— or —OC(=O)—; T represents 1,4-phenylene; and

Sp represents a divalent aliphatic group having 2 to 6 carbon atoms which may have a substituent. One $CH_2$ in this aliphatic group or two or more non-adjacent $CH_2$ may be substituted with —O—, —OC(=O)—, —C(=O)O—, or —OC(=O)O—.

n1 represents an integer of 3 to 6, preferably 3 or 4.

$Z^{12}$ represents —C(=O)— or —C(=O)—CH=CH— and preferably —C(=O)—.

$R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), preferably a methyl group, an ethyl group, a propyl group, a methoxy group, an ethoxy group, a phenyl group, an acryloylamino group, a methacryloylamino group, or a group represented by Formula (IV-3), and more preferably a methyl group, an ethyl group, a methoxy group, an ethoxy group, a phenyl group, an acryloylamino group, a methacryloylamino group, or a structure represented by Formula (IV-3).

Examples of the compound represented by Formula (IV) include compounds described in paragraphs [0020] to [0036] of JP2014-198814A.

As the liquid crystal compound for use in the present invention, a compound represented by Formula (VI) and described in JP2014-198814A, in particular, a liquid crystal compound having no (meth)acrylate group represented by Formula (VI) is also suitably used.

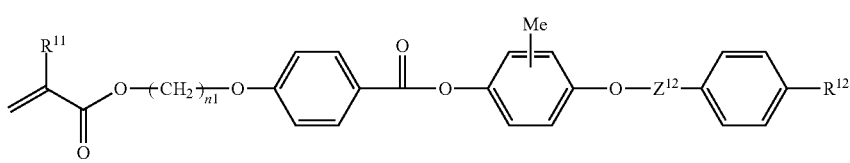

Formula (V)

Formula (VI)

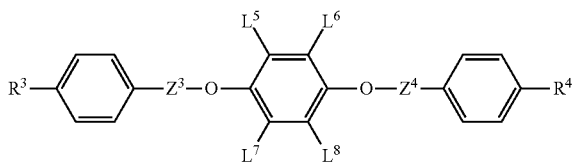

In Formula (VI), $Z^3$ represents —C(=O)— or —CH=CH—C(=O)—;

$Z^4$ represents —C(=O)— or —C(=O)—CH=CH—;

$R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (VI-2); and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

—$Z^5$-T-Sp-P    Formula (VI-2)

In Formula (VI-2), P represents an acryloyl group, a methacryl group, or a hydrogen atom, $Z^5$ represents —C(=O)O—, —OC(=O)—, —C(=O)NR$^1$— (where $R^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent. However, one CH$_2$ in this aliphatic group or two or more non-adjacent CH$_2$ may be substituted with —O—, —S—, —OC(=O)—, —C(=O)O—, or —OC(=O)O—.

The compound represented by Formula (VI) is preferably a compound represented by Formula (VII).

Formula (VII)

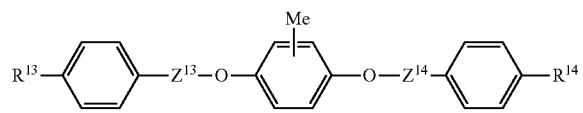

In Formula (VII), $Z^{13}$ represents —C(=O)— or —C(=O)—CH=CH—;

$Z^{14}$ represents —C(=O)— or —CH=CH—C(=O)—; and $R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

$Z^{13}$ represents —C(=O)— or —C(=O)—CH=CH— and preferably —C(=O)—.

$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3), preferably a methyl group, an ethyl group, a propyl group, a methoxy group, an ethoxy group, a phenyl group, an acryloylamino group, a methacryloylamino group, or a structure represented by Formula (IV-3), and more preferably a methyl group, an ethyl group, a methoxy group, an ethoxy group, a phenyl group, an acryloylamino group, a methacryloylamino group, or a structure represented by Formula (IV-3).

Examples of the compound represented by Formula (VI) include compounds described in paragraphs [0042] to [0049] of JP2014-198814A.

As the liquid crystal compound for use in the present invention, a compound represented by Formula (VIII) and described in JP2014-198814A, in particular, a polymerizable liquid crystal compound having two (meth)acrylate groups represented by Formula (VIII) is also suitably used.

Formula (VIII)

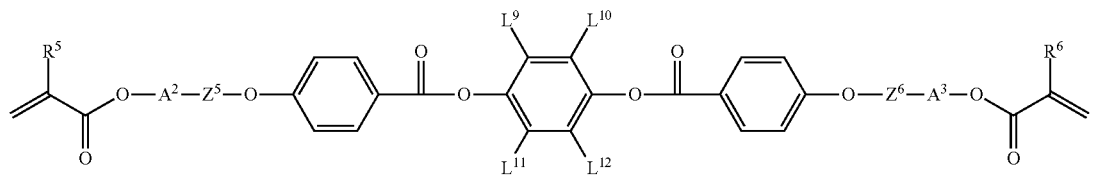

In Formula (VIII), $A^2$ and $A^3$ each independently represent an alkylene group having 2 to 18 carbon atoms, and one CH$_2$ in the alkylene group or two or more non-adjacent CH$_2$ may be substituted with —O—;

$Z^5$ represents —C(=O)—, —OC(=O)—, or a single bond;

$Z^6$ represents —C(=O)—, —C(=O)O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$ represents a group other than a hydrogen atom.

The compound represented by Formula (VIII) is preferably a compound represented by Formula (IX).

Formula (IX)

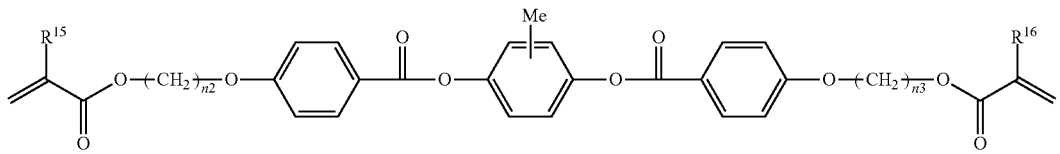

In Formula (IX), n2 and n3 each independently represent an integer of 3 to 6; and
$R^{15}$ and $R^{16}$ each independently represent a hydrogen atom or a methyl group.

In Formula (IX), it is preferred that n2 and n3 each independently represent an integer of 3 to 6, and n2 and n3 are 4.

In Formula (IX), it is preferred that $R^{15}$ and $R^{16}$ each independently represent a hydrogen atom or a methyl group, and $R^{15}$ and $R^{16}$ each represent a hydrogen atom.

Examples of the compound represented by Formula (VIII) include compounds described in paragraphs [0056] and [0057] of JP2014-198814A.

Such liquid crystal compounds can be produced by a known method.

(Chiral Agent (Chiral Compound))

The composition contains a chiral agent.

The type of the chiral agent is not particularly limited. The chiral agent may be liquid crystalline or non-liquid crystalline. The chiral agent may be selected from a variety of known chiral agents (for example, as described in Liquid Crystal Device Handbook, Chap. 3, Item 4-3, Chiral Agents for Twisted Nematic (TN) and Super Twisted Nematic (STN), p. 199, edited by the $142^{nd}$ Committee of the Japan Society for the Promotion of Science, 1989). The chiral agent generally contains an asymmetric carbon atom; however, an axial asymmetric compound or planar asymmetric compound not containing an asymmetric carbon atom may also be used as the chiral agent. Examples of the axial asymmetric compound or the planar asymmetric compound include binaphthyl, helicene, paracyclophane, and derivatives thereof. The chiral agent may have a polymerizable group.

The content of the chiral agent in the composition is preferably 0.5% to 30% by mass with respect to the total mass of the liquid crystal compound. The chiral agent is preferably used in a smaller amount, as it tends not to affect the liquid crystallinity. Accordingly, the chiral agent is preferably a compound having a strong twisting power in order that the compound could achieve twisted alignment of the desired helical pitch even though its amount used is small.

Examples of such a chiral agent having strong twisting power include the chiral agents described in, for example, JP2002-302487A, JP2002-080478A, JP2002-080851A, JP2002-179668A, JP2002-179670A, JP2002-338575A, JP2002-180051A, JP1987-081354A (JP-S62-081354A), WO2002/006195A, JP2011-241215A, JP2003-287623A, JP2002-302487A, JP2002-080478A, JP2002-080851A, and JP2014-034581A, and LC-756 manufactured by BASF Corporation.

(Optional Components)

The composition may contain components other than the liquid crystal compound and the chiral agent.

(Polymerization Initiator)

The composition may contain a polymerization initiator. In particular, in a case where the liquid crystal compound has a polymerizable group, the composition preferably contains a polymerization initiator.

The polymerization initiator is preferably a photopolymerization initiator capable of initiating a polymerization reaction upon ultraviolet irradiation. Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the composition is not particularly limited, but it is preferably 0.1% to 20% by mass and more preferably 1% to 8% by mass, with respect to the total mass of the liquid crystal compound.

(Alignment Control Agent (Alignment Agent))

The composition may contain an alignment control agent. The inclusion of the alignment control agent in the composition makes it possible to achieve stable or rapid formation of a cholesteric liquid crystalline phase.

Examples of the alignment control agent include fluorine-containing (meth)acrylate-based polymers, compounds represented by General Formulae (X1) to (X3) described in WO2011/162291A, compounds described in paragraphs [0007] to [0029] of JP2012-211306A, compounds described in paragraphs [0020] to [0031] of JP2013-047204A, compounds described in paragraphs [0165] to [0170] of WO2016/009648A, the compounds described in paragraphs [0077] to [0081] of WO2016/092844, and General Formulae (Cy201) to (Cy211) described in JP4592225B. The composition may contain two or more selected from these compounds. These compounds can reduce the tilt angle of the molecules of the liquid crystal compound at the air interface of the layer, or align the molecules substantially horizontally. In the present specification, the term "horizontal alignment" refers to that the long axis of the liquid crystal molecule is parallel to the film surface, but does not require strict parallelism. In the present specification, the "horizontal alignment" means an alignment in which the tilt angle to the horizontal plane is less than 20°.

In addition, in a case where a vertical alignment agent as an alignment control agent is added in order to form a discontinuous point, as described above, it is preferable to add the above-mentioned vertical alignment agent, in place of such an alignment control agent (horizontal alignment agent) which horizontally aligns a liquid crystal compound, to the composition.

The alignment control agents may be used alone or in combination of two or more thereof.

The content of the alignment control agent in the composition is not particularly limited, but it is preferably 0.01% to 10% by mass, more preferably 0.01% to 5% by mass, and still more preferably 0.01% to 1% by mass, with respect to the total mass of the liquid crystal compound.

(Solvent)

The composition may contain a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate. These solvents may be used alone or in combination of two or more thereof.

(Other Additives)

The composition may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a color material such as a dye and a pigment.

Such a structure 10 according to the embodiment of the present invention can be produced by forming the reflective layer 14 on the substrate 12.

In the formation of the reflective layer 14, first, an alignment treatment for controlling the horizontal alignment of a liquid crystal compound such as a rubbing treatment is carried out on the surface of the substrate 12 on which the reflective layer 14 is formed. On the other hand, a composition containing a liquid crystal compound, a chiral agent, and an alignment control agent as described above is prepared.

Then, the prepared composition is applied onto the substrate 12 that has been subjected to the alignment treatment.

The application method is not particularly limited, and examples thereof include a wire bar coating method, an extrusion coating method, a direct gravure coating method, a reverse gravure coating method, and a die-coating method.

Where appropriate, a treatment for drying the composition applied onto the substrate 12 may be carried out after application. By carrying out the drying treatment, the solvent can be removed from the applied composition.

Next, the composition (composition layer (coating film)) applied onto the substrate 12 is heated to align the liquid crystal compound in the composition into a cholesteric liquid crystalline phase state.

The liquid crystalline phase transition temperature of the composition is preferably 10° C. to 250° C. and more preferably 10° C. to 150° C. from the viewpoint of manufacturing suitability.

As to preferred heating conditions, the composition is heated at 40° C. to 100° C. (preferably 60° C. to 100° C.) for 0.5 to 5 minutes (preferably 0.5 to 2 minutes).

In a case where the composition is heated to bring the liquid crystal compound into a cholesteric liquid crystalline phase state, the reflective layer 14 is formed by cooling or heating the composition so as to improve the helical twisting power of the chiral agent contained in the composition. That is, the coating layer is subjected to a cooling treatment or a heating treatment such that the helical twisting power (HTP) of the chiral agent contained in the composition constituting the coating layer (composition layer) formed on the substrate 12 is increased.

By subjecting the coating layer to the cooling treatment and the heating treatment, the helical twisting power of the chiral agent is increased, then the twist of the liquid crystal compound is increased, and consequently, the alignment of the cholesteric liquid crystalline phase (inclination of the helical axis) is changed. As a result, the bright portions 16 and the dark portions 18 parallel to the substrate 12 are changed to form the reflective layer 14 (a layer of a composition in a cholesteric liquid crystalline phase state) having bright portions 16 and dark portions 18 having a wave-like structure (uneven structure) as shown in FIG. 1 (FIG. 3).

In a case where the composition is cooled, it is preferable to cool the composition such that the temperature of the composition drops by 30° C. or more, from the viewpoint of superior diffuse reflectivity of the reflective layer 14. Among them, from the viewpoint of superior effects, it is preferable to cool the composition so as to lower by 40° C. or more, and it is more preferable to cool the composition so as to lower by 50° C. or more. The upper limit value of the reduction temperature width of the cooling treatment is not limited, but it is usually about 70° C.

In other words, the cooling treatment is intended to cool the composition such that the temperature of the composition is T−30° C. or less in a case where the temperature of the composition in the cholesteric liquid crystalline phase state before cooling is T° C.

The method of cooling is not particularly limited and may be, for example, a method of leaving the substrate on which the composition is placed in an atmosphere at a predetermined temperature.

The cooling rate in the cooling treatment is not limited, but in order to suitably form the wave-like structure of the bright portions 16 and the dark portions 18 of the cholesteric liquid crystalline phase, or further the unevenness on the surface 24 of the reflective layer 14, it is preferable to set the cooling rate to a certain degree of speed.

Specifically, the cooling rate in the cooling treatment is preferably such that the maximum value thereof is 1° C. per second or more, more preferably 2° C. per second or more, and still more preferably 3° C. per second or more. The upper limit of the cooling rate is not limited, but it is often 10° C. per second or less.

In a case where the liquid crystal compound has a polymerizable group, the composition on the substrate 12 may be subjected to a curing treatment following the cooling treatment or heating treatment, whereby the liquid crystal compound is three-dimensionally cross-linked to immobilize the cholesteric liquid crystalline phase, thus forming the reflective layer 14.

This curing treatment may be carried out simultaneously with the cooling treatment or the heating treatment, or may be carried out after the cooling treatment or the heating treatment.

As the state where the cholesteric liquid crystalline phase is "immobilized", the most typical and preferred aspect is a state in which the alignment of the liquid crystal compound brought into a cholesteric liquid crystalline phase is retained. The state where the cholesteric liquid crystalline phase is "immobilized" is not limited thereto, and specifically, it refers to a state in which, in a temperature range of usually 0° C. to 50° C. and in a temperature range of −30° C. to 70° C. under more severe conditions, this layer has no fluidity and can keep an immobilized alignment state stably without causing changes in alignment state due to external field or external force. In the present invention, as will be described later, it is preferable to immobilize the alignment state of a cholesteric liquid crystalline phase by a curing reaction proceeding upon ultraviolet irradiation.

In the layer obtained by immobilizing a cholesteric liquid crystalline phase, it is sufficient that the optical properties of the cholesteric liquid crystalline phase are retained in the layer, and finally the composition in the layer no longer needs to show liquid crystallinity.

The method of the curing treatment is not particularly limited, and examples thereof include a photo curing treatment and a thermal curing treatment. Among them, a light irradiation treatment is preferable, and an ultraviolet irradiation treatment is more preferable.

For ultraviolet irradiation, a light source such as an ultraviolet lamp is used.

The irradiation energy amount of ultraviolet rays is not particularly limited, but it is generally preferably about 0.1 to 0.8 J/cm$^2$. The irradiation time of the ultraviolet rays is not particularly limited, but it may be determined as appropriate from the viewpoint of both sufficient strength and productivity of the obtained layer.

In the formation of such a reflective layer 14 having a wave-like structure, the reflective layer 14 having a wave-like structure and having discontinuous points can be formed by carrying out one or more of applying a composition for forming the reflective layer 14 without subjecting the substrate 12 to an alignment treatment such as a rubbing treatment; adding a vertical alignment agent as a composition alignment control agent for forming the reflective layer 14; and adding particles (foreign matter) to the composition for forming the reflective layer 14, as described above.

In a case where the structure according to the embodiment of the present invention has a plurality of cholesteric reflective layers, similarly, the cholesteric liquid crystal layer may be formed in such a manner that a composition containing a liquid crystal compound, a chiral agent, and an alignment control agent is prepared, the prepared composition is applied onto the cholesteric liquid crystal layer formed above, the liquid crystal compound in the composition is aligned into a cholesteric liquid crystalline phase state, and where appropriate, a curing treatment is carried out.

As described above, in a case where the lower cholesteric liquid crystal layer has a wave-like structure in the cross section, the upper cholesteric liquid crystal layer also has a wave-like structure of bright portions and dark portions in the cross section, following the wave-like structure of the lower cholesteric liquid crystal layer. Therefore, also in the cholesteric liquid crystal layer formed on the cholesteric liquid crystal layer by an application method, the bright portions 16 and the dark portions 18 in the cross section have a wave-like structure.

Therefore, in a case where a cholesteric liquid crystal layer is further formed on the cholesteric liquid crystal layer, cooling or heating of the composition for improving the HTP to form a wave-like structure may be carried out as necessary.

In the structure 10 shown in FIG. 1, the surface of the substrate 12 is flat, and the reflective layer 14 (a layer of a composition in a cholesteric liquid crystalline phase state) in which the lines formed by the bright portions 16 and the lines formed by the dark portions 18 in the cross section have a wave-like structure is formed by changing the alignment of the cholesteric liquid crystalline phase (inclination of the helical axis) in the reflective layer 14.

In the structure according to the embodiment of the present invention, the cholesteric liquid crystal layer in which the lines formed by the bright portions 16 and the lines formed by the dark portions 18 in the cross section have a wave-like structure is not limited thereto, and various configurations can be used.

Figure 4:
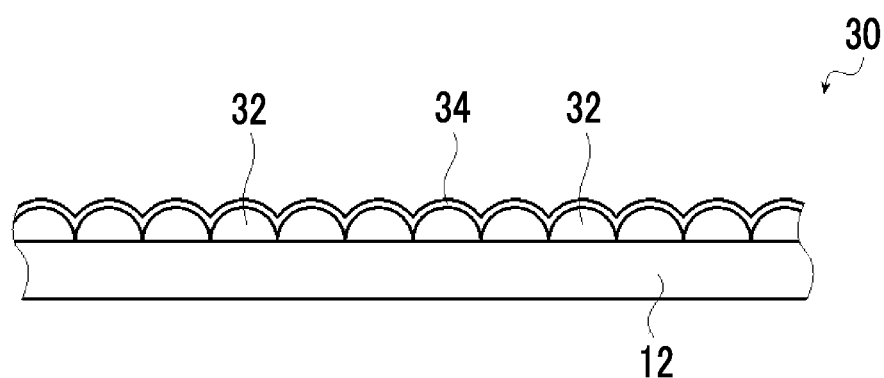
FIG. 4 is a cross-sectional view conceptually showing another example of the structure of the present invention.
Figure 5:
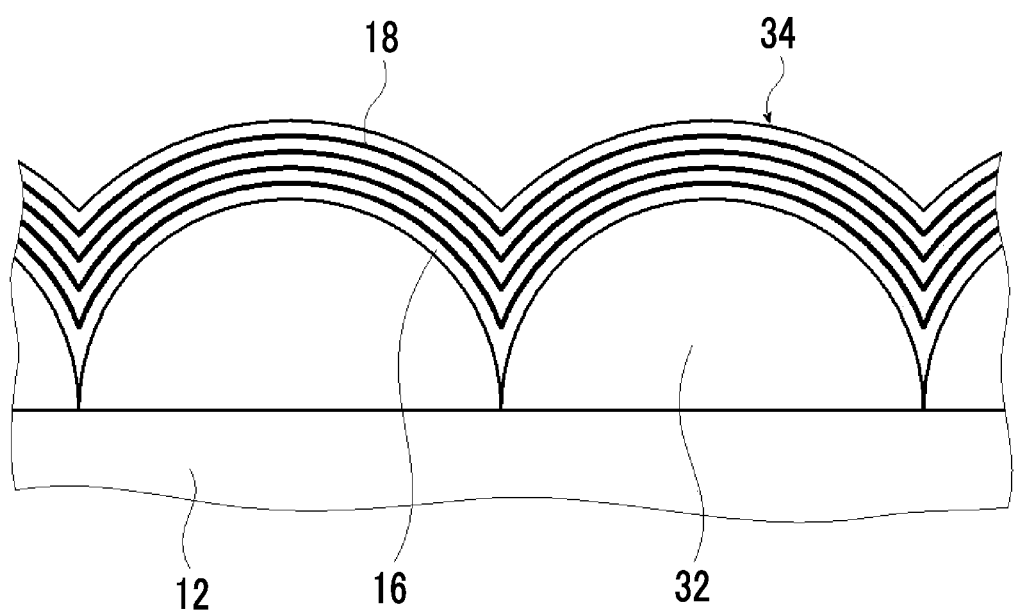
FIG. 5 is a partially enlarged view of FIG. 4.

As an example, as in a structure 30 conceptually shown in FIG. 4 and FIG. 5 which is a partially enlarged view of FIG. 4, a configuration in which convex portions 32 such as transparent hemispheres are formed on the surface of the substrate 12 and a reflective layer 34 (cholesteric liquid crystal layer) is formed by immobilizing a cholesteric liquid crystalline phase so as to cover the convex portions 32 is illustrated. FIGS. 4 and 5 show another example of the wave-like structure, and therefore the illustration of discontinuous points (alignment defect portions) is omitted.

In this structure 30, the alignment of the cholesteric liquid crystalline phase in the reflective layer 34 is perpendicular to the formation surface as in a case of a normal cholesteric liquid crystal layer. However, in a case where the structure 30 is viewed as a whole, the lines formed by the bright portions 16 and the lines formed by the dark portions 18 have a wave-like structure.

In this structure 30, the convex portions 32 may be formed by, for example, forming dots by an ink jet method or the like using a liquid composition containing a transparent resin material, and curing the formed dots by ultraviolet irradiation or the like as necessary. Alternatively, a glass blast mat sheet, a microlens array sheet, or the like on which the convex portions 32 are formed may be used as the substrate.

The reflective layer 34 may be formed by preparing a composition (liquid crystal composition) containing a liquid crystal compound, a chiral agent, and a horizontal alignment agent as described above, applying the composition so as to cover the convex portions 32, aligning the liquid crystal compound into a cholesteric liquid crystalline phase state, and then curing the composition. In this case, alignment defects are caused in the cholesteric liquid crystalline phase of the reflective layer 34 by one or more of the convex portions 32 not being subjected to an alignment treatment; the composition being set to contain a vertical alignment agent; and the composition being set to contain particles, whereby discontinuous points can be formed on the lines formed by the bright portions 16 and the lines formed by the dark portions 18.

With respect to the shape of the convex portions 32, various shapes such as a truncated spherical shape (substantially truncated spherical shape) can be used in addition to a hemispherical shape (substantially hemispherical shape).

In the structure 10 described above, in the reflective layer 14, the lines formed by the bright portions 16 and the dark portions 18 derived from the cholesteric liquid crystalline phase in the cross section observed with SEM have a wave-like structure.

Figure 6:
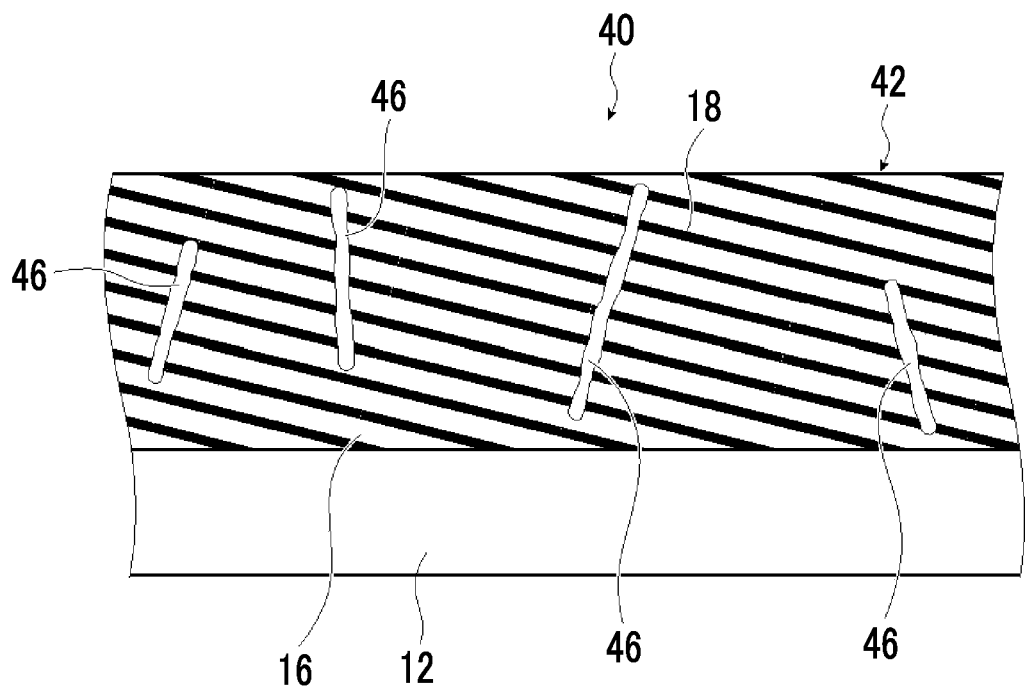
FIG. 6 is a cross-sectional view conceptually showing another example of the structure of the present invention.

In contrast, in a structure 40 according to another aspect of the present invention conceptually shown in FIG. 6, a reflective layer 42 is configured such that the lines formed by the bright portions 16 and the lines formed by the dark portions 18 derived from the cholesteric liquid crystalline phase in the cross section observed with SEM are inclined with respect to the surface of the substrate 12, that is, the surface on which the reflective layer 42 is formed, and the cholesteric liquid crystalline phase has alignment defect portions 46, whereby the lines formed by the bright portions 16 and the lines formed by the dark portions 18 have discontinuous points.

Since the structure 40 shown in FIG. 6 is basically the same as the structure 10 described above, except that the lines formed by the bright portions 16 and the lines formed by the dark portions 18 are not wave-like structures but are inclined with respect to the surface of the substrate 12, the following description will mainly focus on differences therebetween.

As described above, in the configuration in which the lines formed by the bright portions 16 and the lines formed by the dark portions 18 are inclined with respect to the surface of the substrate 12, the reflection axis is in a direction orthogonal to the lines formed by the bright portions 16 and the lines formed by the dark portions 18. Therefore, the reflection direction of light by the reflective layer 42 is non-specular.

Figure 7:
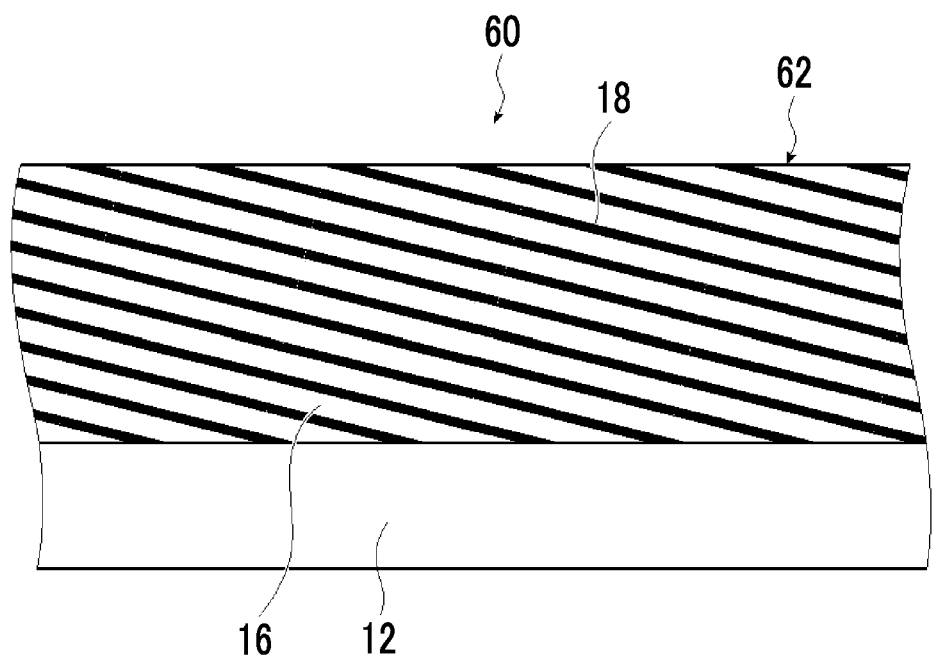
FIG. 7 is a cross-sectional view conceptually showing a conventional structure.

As in a structure 60 conceptually shown in FIG. 7, in a case where the lines formed by the bright portions 16 and the lines formed by the dark portions 18 of a reflective layer 62 (cholesteric liquid crystal layer) are inclined with respect to the surface of the substrate 12, that is, the surface on which the reflective layer 42 is formed, the lines formed by the linear bright portions 16 and the lines formed by the linear dark portions 18 are alternately formed in one direction at uniform (substantially uniform) intervals in the in-plane direction of the reflective layer 62. That is, also in this configuration, the reflective layer 62 has a periodic structure in which the lines formed by the linear bright portions 16 and the lines formed by the linear dark portions 18 are alternately formed in the in-plane direction.

Therefore, similarly to the above-mentioned cholesteric liquid crystal layer 50b having a wave-like structure (see FIG. 3), a strong diffraction phenomenon occurs due to this periodic structure, which results in the occurrence of glare in the projected image, for example, in applications such as a screen.

On the other hand, the structure 40 according to the embodiment of the present invention is configured such that the lines formed by the bright portions 16 and the lines formed by the dark portions 18 of the reflective layer 42 are inclined with respect to the surface of the substrate 12, that is, the surface on which the reflective layer 42 is formed, and at least a part of the lines formed by the linear bright portions 16 and the lines formed by the linear dark portions 18 is discontinuous. As a result, the continuity and regularity of the periodic structure due to the alternate and repeated formation of the lines formed by the bright portions 16 and the lines formed by the dark portions 18 can be reduced in the in-plane direction of the reflective layer 42, which in turn makes it possible to prevent the occurrence of a strong diffraction phenomenon derived from the periodic structure of the wave-like structure.

Further, in this aspect, since the reflection axis of the reflective layer 42 (cholesteric liquid crystal layer) is basically uniform, no scattered wave is generated in a wavelength range other than the wavelength reflected by the interference phenomenon, and thus transparency can be secured.

Therefore, for example, in a case of being used for applications such as a transparent screen, the structure 40 according to the embodiment of the present invention also has satisfactory non-specular reflectivity and transparency, and reduces the glare of the projection light, thereby making it possible to achieve both visibility of the background and satisfactory observation of the projection light.

In the present invention, the fact that the lines formed by the bright portions 16 and the lines formed by the dark portions 18 are inclined with respect to the surface of the substrate 12 indicates a state in which the lines formed by the bright portions 16 and the lines formed by the dark portions 18 (major axis of liquid crystal molecules) are not parallel to the surface of the substrate 12. In other words, the angle formed between the helical axis of the cholesteric liquid crystalline phase and the surface of the substrate 12 is other than 90° and is uniform.

Preferably, the fact that the lines formed by the bright portions 16 and the lines formed by the dark portions 18 are inclined with respect to the surface of the substrate 12 indicates a state in which the angle formed between the lines formed by the bright portions 16 and the lines formed by the dark portions 18 and the surface of the substrate 12 is ±50 or more. In other words, preferably, the angle formed between the helical axis of the cholesteric liquid crystalline phase and the surface of the substrate 12 is 90°+5° or more.

Such a reflective layer 42 in which the lines formed by the bright portions 16 and the lines formed by the dark portions 18 are inclined with respect to the surface of the substrate 12 can be formed with reference to, for example, a method described in Apply. Phys. Lett. 1998. 921.

In the formation of such a reflective layer 42, similarly to the above-mentioned formation of the reflective layer 14 having the wave-like structure described above, alignment defect portions 46 are generated in the cholesteric liquid crystalline phase by adding a vertical alignment agent and/or adding particles to the composition for forming the reflective layer 42, whereby the reflective layer 42 can be formed in which the lines formed by the bright portions 16 and the lines formed by the dark portions 18 are inclined with respect to the surface of the substrate 12 and at least a part of the lines formed by the linear bright portion 16 and the lines formed by the linear dark portion 18 is discontinuous.

Such a structure according to the embodiment of the present invention can be used as a projected image display screen and a half mirror. In addition, the structure can also be used as a color filter or a filter that improves the color purity of display light of a display, by controlling the reflection band thereof (for example, see JP2003-294948A).

In addition, the structure can be used for various applications such as a polarizing element, a reflective film, an anti-reflection film, a viewing angle compensating film, a holography, and an alignment film, which are constituent elements of an optical element.

The structure according to the embodiment of the present invention is particularly preferably used as a projected image display member such as a projected image display screen. Specifically, the structure according to the embodiment of the present invention is suitably used as a transparent screen and a bright room screen.

That is, by the function of the cholesteric liquid crystal layer as described above, a projected image can be formed by reflecting circularly polarized light of either sense at the wavelength showing selective reflection among the projection light. The projected image may be visually recognized as such by being displayed on the surface of the projected image display member or may be a virtual image which appears to emerge above the projected image display member as viewed from an observer.

By adjusting the central wavelength of the selective reflection of each cholesteric liquid crystal layer according to the emission wavelength range of the light source used for projection and the mode of use of the projected image display member, a clear projected image can be displayed with high efficiency of light utilization. In particular, by adjusting the central wavelengths of the selective reflection of the cholesteric liquid crystal layer respectively according to the light emission wavelength range of the light source used for projection or the like, a clear color projected image can be displayed with high efficiency of light utilization.

In addition, for example, by configuring the projected image display member so as to have transmittivity to light in the visible light region, it is possible to provide a half mirror usable as a combiner of a head up display. The half mirror for projected image display is capable of displaying the image projected from the projector in a viewable manner, and in a case of observing the half mirror for projected image display from the same surface side on which the image is displayed, it is possible to simultaneously observe information or landscape on the opposite surface side.

EXAMPLES

Hereinafter, the features of the present invention will be described in more detail with reference to Examples and Comparative Examples. The materials, the used amount, the ratio, the contents of a treatment, and the procedures of a treatment described in Examples below may be suitably modified without departing from the spirit of the present invention. Accordingly, the scope of the present invention should not be limitatively interpreted by the specific examples described below.

[Preparation of Compositions 1 to 5]

Compositions 1 to 5 were prepared by mixing the components shown in Table 1 below. In addition, all the quantity of each component is parts by mass.

TABLE 1

|  | Composition 1 | Composition 2 | Composition 3 | Composition 4 | Composition 5 |
|---|---|---|---|---|---|
| Rod-like liquid crystal compound 101 | 55 | 55 | 55 | 55 | 55 |
| Rod-like liquid crystal compound 102 | 35 | 35 | 35 | 35 | 35 |
| Rod-like liquid crystal compound 201 | 13 | 13 | 13 | 13 | 13 |
| Rod-like liquid crystal compound 202 | 2 | 2 | 2 | 2 | 2 |
| Chiral agent A | 3.1 | 5.1 | 3.1 | 3.1 | 3.1 |
| Polymerization initiator IRGACURE OXE-01 (manufactured by BASF Corporation) | 2 | 2 | 2 | 2 | 2 |
| Alignment control agent 1 (horizontal alignment agent) | 0.06 | 0.06 | 0 | 0.06 | 0.06 |
| Alignment control agent 2 (vertical alignment agent) | 0 | 0 | 0.06 | 0 | 0 |
| Nanodiamond with average particle size of 50 nm | 0.05 | 0.025 | 0 | 0.003 | 0 |
| Cyclohexanone (manufactured by Wako Pure Chemical Industries, Ltd.) | 50 | 50 | 50 | 50 | 50 |
| Methyl acetate (manufactured by Wako Pure Chemical Industries, Ltd.) | 285 | 285 | 285 | 285 | 285 |

The nanodiamond with an average particle size of 50 nm is FND 50 (manufactured by Vision Development, Inc.).

Rod-like liquid crystal compound 101

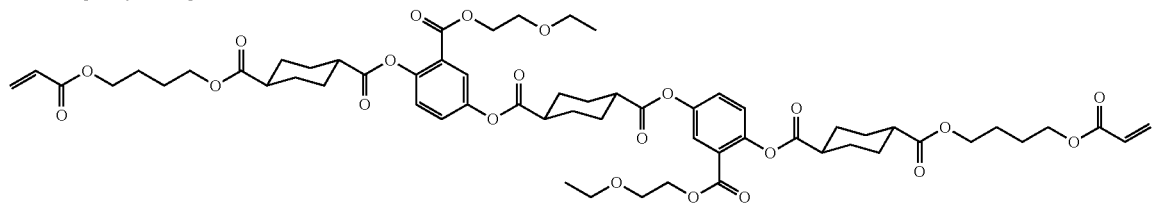 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1]

Rod-like liquid crystal compound 102

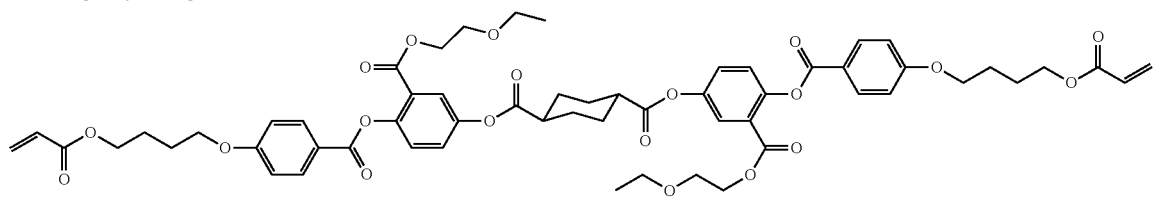 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1]

Rod-like liquid crystal compound 201

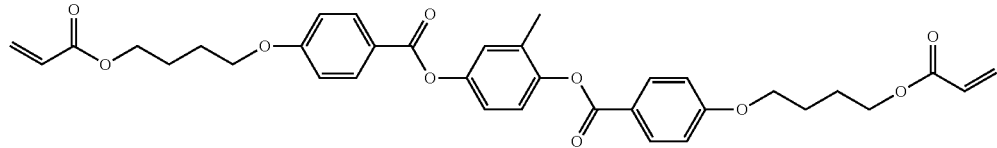 [SMILES: C=CC(=O)OCCCCOc1ccc(C(=O)Oc2ccc(OC(=O)c3ccc(OCCCCOC(=O)C=C)cc3)c(C)c2)cc1]

Rod-like liquid crystal compound 202

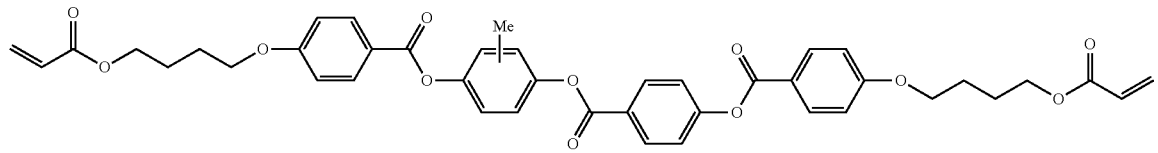

Chiral agent A

TABLE 1-continued

|  | Composition 1 | Composition 2 | Composition 3 | Composition 4 | Composition 5 |
|---|---|---|---|---|---|

Alignment control agent 1 (horizontal alignment agent)

Alignment control agent 2 (vertical alignment agent)

Examples 1 to 3 and 6 and Comparative Example 1

(Production of Structure)

A rubbing-treated polyethylene terephthalate (PET) film (manufactured by Toyobo Co., Ltd.) was prepared as a substrate.

The composition shown in Table 1 was applied onto the rubbing-treated surface of the substrate using a wire bar. The coating layer of the composition was dried at room temperature for 50 seconds, and then heated at 95° C. for 1 minute to align a liquid crystal compound.

Thereafter, the coating layer was ultraviolet-irradiated (ultraviolet (UV) light) at 30° C. for 8 seconds using a Fusion D bulb (lamp 90 mW/cm$^2$) at an output of 80% to form a reflective layer (cholesteric liquid crystal layer) on the substrate, thus producing a structure.

In the above procedure, after aligning the liquid crystal compound at 95° C., the liquid crystal composition was cooled to 30° C.

Example 4

A structure was prepared in the same manner as in Example 1, except that a PET film not subjected to a rubbing treatment was used as the substrate.

Example 5

(Preparation of Polymerizable Composition Coating Liquid A)

The following components were mixed to prepare a polymerizable composition coating liquid A.

| | |
|---|---|
| Blemmer 758 (manufactured by NOF Corporation) | 100 parts by mass |
| Air interface aligning agent (A-2) | 0.02 parts by mass |
| Polymerization initiator | 3 parts by mass |
| (Irg 819, manufactured by BASF Corporation) | |
| Methyl ethyl ketone | 200 parts by mass |
| (MEK, manufactured by Wako Pure Chemical Industries, Ltd.) | |

Air interface alignment agent (A-2)

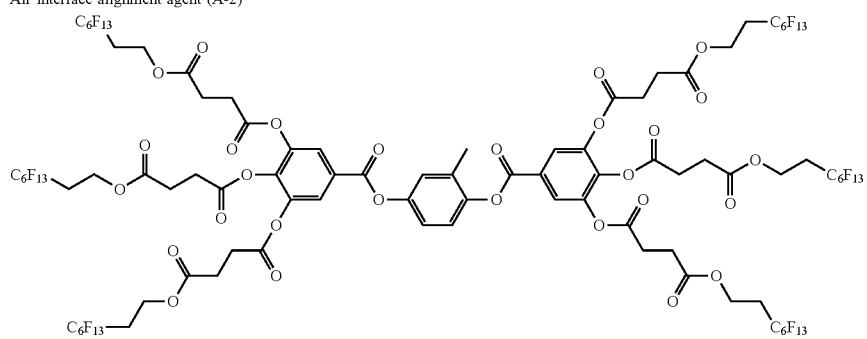

<Preparation of Acrylic Layer>

A PET film (manufactured by Toyobo Co., Ltd.) was prepared.

The polymerizable composition coating liquid A was applied onto the PET film at room temperature using a wire bar. The obtained coating layer was dried at room temperature for 30 seconds and then heated at 85° C. for 2 minutes.

Thereafter, the coating layer was ultraviolet-irradiated at 30° C. for 6 seconds using a Fusion D bulb (lamp 90 mW/cm$^2$) at an output of 60% to form an acrylic layer. This acrylic layer corresponds to an underlayer.

A part of the formed acrylic layer was peeled off, and the film thickness was measured by a profile measurement laser microscope VK-X200 (manufactured by Keyence Corporation) using a 10× objective lens. As a result, the thickness of the acrylic layer was 3 μm.

A structure was produced in the same manner as in Example 1, except that a PET film on which this acrylic layer was formed was used as the substrate and Composition 5 was used. The reflective layer was formed on the acrylic layer.

[State of Reflective Layer]

For each of the structures produced in Examples 1 to 5 and Comparative Example 1, a part of the reflective layer was peeled off, and the film thickness of the reflective layer was measured by a profile measurement laser microscope VK-X200 (manufactured by Keyence Corporation) using a 10× objective lens. As a result, the thickness of the reflective layer was 3.5 μm.

In addition, the cross section of the structure was cut with an ultramicrotome and subjected to a conductive treatment by carbon deposition, and then a secondary electron image thereof at an acceleration voltage of 2 kV was observed by SEM (SU8030, manufactured by Hitachi High-Technologies Corporation). It was confirmed in each reflective layer that the lines formed by the bright portions and the lines formed by the dark portions had a wave-like structure.

Furthermore, in a case where this SEM image was analyzed to measure the helical pitch of the cholesteric liquid crystalline phase, the helical pitch was 520 nm in a case of using Compositions 1, 3, and 4, and 320 nm in a case of using Composition 2.

[Discontinuous Point Counting]

The cross-sectional SEM image was analyzed to count the number of discontinuous points in the dark portions per 1 μm$^2$ in the cross section of the reflective layer. The number of discontinuous points in the dark portions per 1 μm$^2$ was obtained by observing the cross section of the reflective layer with SEM, selecting any two 100 μm$^2$ regions in the cross section, counting the number of discontinuous points in the dark portions in each region, and dividing the average value by the area to determine the number of discontinuous points in the dark portions per 1 μm$^2$ of the cross section of the reflective layer ([discontinuous points/μm$^2$]).

[Evaluation of Glare]

The produced structure was evaluated according to the following standards by visually confirming the uniformity of the reflection color in the in-plane direction in the reflective layer by freely changing the observation angle in an environment of white light.

A: There is no variation in reflection color in the in-plane direction and no occurrence of glare.

B: There is almost no variation in reflection color in the in-plane direction and no occurrence of glare.

C: There is some variation in reflection color in the in-plane direction and the occurrence of glare is inconspicuous.

D: There is a variation in reflection color in the in-plane direction and the occurrence of glare.

The results are shown in Table 2.

TABLE 2

| | Composition | | | Rubbing of substrate | Number of discontinuous points [discontinuous points/μm$^2$] | Evaluation of glare |
|---|---|---|---|---|---|---|
| | Type | Alignment control agent | Particles | | | |
| Example 1 | Composition 1 | Horizontal alignment agent | 0.05 parts by mass | Rubbed | 0.31 | A |
| Example 2 | Composition 2 | Horizontal alignment agent | 0.025 parts by mass | Rubbed | 0.39 | A |
| Example 3 | Composition 3 | Vertical alignment agent | Not added | Rubbed | 0.11 | B |
| Example 4 | Composition 1 | Horizontal alignment agent | 0.05 parts by mass | Not rubbed | 0.43 | A |
| Example 5 | Composition 5 | Horizontal alignment agent | Not added | Not rubbed | 0.24 | A |
| Example 6 | Composition 4 | Horizontal alignment agent | 0.003 parts by mass | Rubbed | 0.04 | C |
| Comparative Example 1 | Composition 5 | Horizontal alignment agent | Not added | Rubbed | 0 | D |

The horizontal alignment agent is alignment control agent 1, and the vertical alignment agent is alignment control agent 2.

The particles are nanodiamond with an average particle size of 50 nm.

Example 5 has an acrylic layer on a substrate.

As shown in Table 2, according to the structure according to the embodiment of the present invention having discontinuous portions, that is, discontinuous points in the lines formed by the bright portions and the lines formed by the dark portions in the reflective layer, the reflective layer has a periodic wave-like structure. In spite of the above, since the continuity and regularity of the periodic structure can be reduced to prevent the occurrence of a strong diffraction phenomenon, variations in the reflection color in the in-plane direction and the occurrence of glare in the projection light can be reduced.

With regard to the fact that the evaluation score of glare in Example 3 was lower than that of other Examples, it is estimated that, in the configuration of Example 3 using the vertical alignment agent, since the vicinity of the substrate was properly aligned into a cholesteric liquid crystalline phase state, and the number of discontinuous points in the vicinity of the substrate was small, the number of discontinuous points was smaller compared to other Examples, and the evaluation score of glare was low.

In contrast, in Comparative Example 1 where the number of discontinuous points in the reflective layer was extremely small, that is, equal to none, it is considered that a strong diffraction phenomenon due to the wave-like periodic structure occurred, which in turn contributed to a variation in reflection color in the in-plane direction, and the glare occurred depending on the observation angle.

The produced structure was set in a spectrophotometer V-670 (manufactured by JASCO Corporation) equipped with an absolute reflectance measuring system with the cholesteric liquid crystal layer facing the light source side, and the height of the reflection performance at 450 was evaluated under 00 incident and 45° detection conditions. As a result, all the structures had satisfactory reflection performance at 450°.

Further, the total light transmittance of the produced structure was measured according to JIS K 7361 using NDH 5000 (manufactured by Nippon Denshoku Industries Co., Ltd.). As a result, all the structures had a sufficient total light transmittance, thus exhibiting sufficient transparency.

From the above results, the effects of the present invention are clear.

The structure according to the embodiment of the present invention can be suitably used as a projected image display screen, a half mirror, or the like.

EXPLANATION OF REFERENCES 10, 30, 40, 60: structure
12: substrate
14, 34, 42, 62: reflective layer
16: bright portion
18: dark portion
20, 46: alignment defect portion
24: surface
32: convex portion
50a, 50b: cholesteric liquid crystal layer
C1: period of wave-like structure
C2: period of unevenness
h: height of unevenness

What is claimed is:

1. A structure comprising:
   a substrate; and
   a reflective layer formed by immobilizing a cholesteric liquid crystalline phase,
   wherein, upon observing a cross section of the reflective layer in a thickness direction by a scanning electron microscope, lines formed by bright portions and lines formed by dark portions derived from the cholesteric liquid crystalline phase have a wave-like structure or are inclined with respect to a surface of the substrate,
   at least a part of the lines formed by the bright portions and the lines formed by the dark portions are discontinuous, and
   the number of a portion where the lines formed by the dark portions are discontinuous is 0.05 or more per 1 µm² of the cross section of the reflective layer.

2. The structure according to claim 1,
   wherein the lines formed by the bright portions and the lines formed by the dark portions derived from the cholesteric liquid crystalline phase have a periodic wave-like structure or are inclined with respect to the surface of the substrate and have a periodic structure in which lines formed by linear bright portions and lines formed by linear dark portions are alternately formed.

3. The structure according to claim 1,
   wherein an alignment defect of the cholesteric liquid crystalline phase is included in a portion where the lines formed by the bright portions and the lines formed by the dark portions are discontinuous.

4. The structure according to claim 1,
   wherein a particle is present in a portion where the lines formed by the bright portions and the lines formed by the dark portions are discontinuous.

5. The structure according to claim 1,
   wherein the lines formed by the bright portions and the lines formed by the dark portions have a wave-like structure, and a wave period of the wave-like structure is 0.3 to 10 µm.

6. A method for forming a reflective layer, comprising:
   applying a composition containing a liquid crystal compound and a chiral agent onto a surface of a substrate without subjecting the surface of the substrate to an alignment treatment, and curing the composition,
   in a case of forming a reflective layer, which is formed by immobilizing a cholesteric liquid crystalline phase, on the surface of the substrate,
   wherein, upon observing a cross section of the reflective layer in a thickness direction by a scanning electron microscope, lines formed by bright portions and lines formed by dark portions derived from the cholesteric liquid crystalline phase have a wave-like structure or are inclined with respect to the surface of the substrate, at least a part of the lines formed by the bright portions and the lines formed by the dark portions are discontinuous, and the number of a portion where the lines formed by the dark portions are discontinuous is 0.05 or more per 1 µm² of the cross section of the reflective layer.

7. The method for forming a reflective layer according to claim 6,
   wherein, after applying the composition onto the surface of the substrate, the composition is heated to bring the liquid crystal compound into a cholesteric liquid crystalline phase state, and then the composition is cooled or heated.

8. A method for forming a reflective layer, comprising:
   applying a composition containing a liquid crystal compound, a chiral agent, and a vertical alignment agent onto a surface of a substrate, and curing the composition,
   in a case of forming a reflective layer, which is formed by immobilizing a cholesteric liquid crystalline phase, on the surface of the substrate,
   wherein, upon observing a cross section of the reflective layer in a thickness direction by a scanning electron microscope, lines formed by bright portions and lines formed by dark portions derived from the cholesteric liquid crystalline phase have a wave-like structure or are inclined with respect to the surface of the substrate, at least a part of the lines formed by the bright portions and the lines formed by the dark portions are discontinuous, and the number of a portion where the lines formed by the dark portions are discontinuous is 0.05 or more per 1 µm² of the cross section of the reflective layer.

9. The method for forming a reflective layer according to claim 8,
wherein, after applying the composition onto the surface of the substrate, the composition is heated to bring the liquid crystal compound into a cholesteric liquid crystalline phase state, and then the composition is cooled or heated.

10. A method for forming a reflective layer, comprising:
applying a composition containing a liquid crystal compound, a chiral agent, and a particle onto a surface of a substrate, and curing the composition,
in a case of forming a reflective layer, which is formed by immobilizing a cholesteric liquid crystalline phase, on the surface of the substrate,
wherein, upon observing a cross section of the reflective layer in a thickness direction by a scanning electron microscope, lines formed by bright portions and lines formed by dark portions derived from the cholesteric liquid crystalline phase have a wave-like structure or are inclined with respect to the surface of the substrate, at least a part of the lines formed by the bright portions and the lines formed by the dark portions are discontinuous, and the number of a portion where the lines formed by the dark portions are discontinuous is 0.05 or more per 1 μm² of the cross section of the reflective layer.

11. The method for forming a reflective layer according to claim 10,
wherein, after applying the composition onto the surface of the substrate, the composition is heated to bring the liquid crystal compound into a cholesteric liquid crystalline phase state, and then the composition is cooled or heated.

12. A structure comprising:
a substrate; and
a reflective layer formed by immobilizing a cholesteric liquid crystalline phase,
wherein, upon observing a cross section of the reflective layer in a thickness direction by a scanning electron microscope, lines formed by bright portions and lines formed by dark portions derived from the cholesteric liquid crystalline phase have a wave-like structure or are inclined with respect to a surface of the substrate,
at least a part of the lines formed by the bright portions and the lines formed by the dark portions are discontinuous, and
the lines formed by the bright portions and the lines formed by the dark portions have a wave-like structure, and a wave period of the wave-like structure is 0.3 to 10 μm.

\* \* \* \* \*